(12) United States Patent
Yamagishi

(10) Patent No.: US 6,510,283 B1
(45) Date of Patent: Jan. 21, 2003

(54) PHOTO-TAKING APPARATUS, CONTROL METHOD ADAPTED FOR THE PHOTO-TAKING APPARATUS, AND COMPUTER PROGRAM PRODUCT SUPPLYING CONTROL PROGRAM ADAPTED FOR THE PHOTO-TAKING APPARATUS

(75) Inventor: Yoichi Yamagishi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 5 days.

(21) Appl. No.: 09/716,512

(22) Filed: Nov. 20, 2000

(30) Foreign Application Priority Data

Nov. 22, 1999 (JP) .......................... 11-331764

(51) Int. Cl.[7] .................. G03B 13/02; G03B 17/00
(52) U.S. Cl. .................. 396/55; 396/374; 348/39; 348/208.99; 348/218.1; 348/333.02; 348/333.05; 348/333.11

(58) Field of Search .................. 396/52–55, 222, 396/287, 374; 348/208, 36, 39, 208.4, 208.99, 218.1, 333.02, 333.03, 333.04, 333.05, 333.11, 333.12

(56) References Cited

U.S. PATENT DOCUMENTS 5,740,470 A * 4/1998 Kitagawa et al. .......... 396/55 X
6,295,415 B1 * 9/2001 Kashiyama et al. ........ 396/222

* cited by examiner

Primary Examiner—W. B. Perkey
(74) Attorney, Agent, or Firm—Robin, Blecker & Daley

(57) ABSTRACT

There are provided a photo-taking apparatus which sets performing a plurality of correlated photo-taking operations and prevents setting of an image-stabilizing function from being changed during the plurality of correlated photo-taking operations, a control method adapted for the photo-taking apparatus, and a computer program product supplying a control program adapted for the photo-taking apparatus.

14 Claims, 22 Drawing Sheets

[SET]End  [+]Change direction

[SET]End  [+]Move V

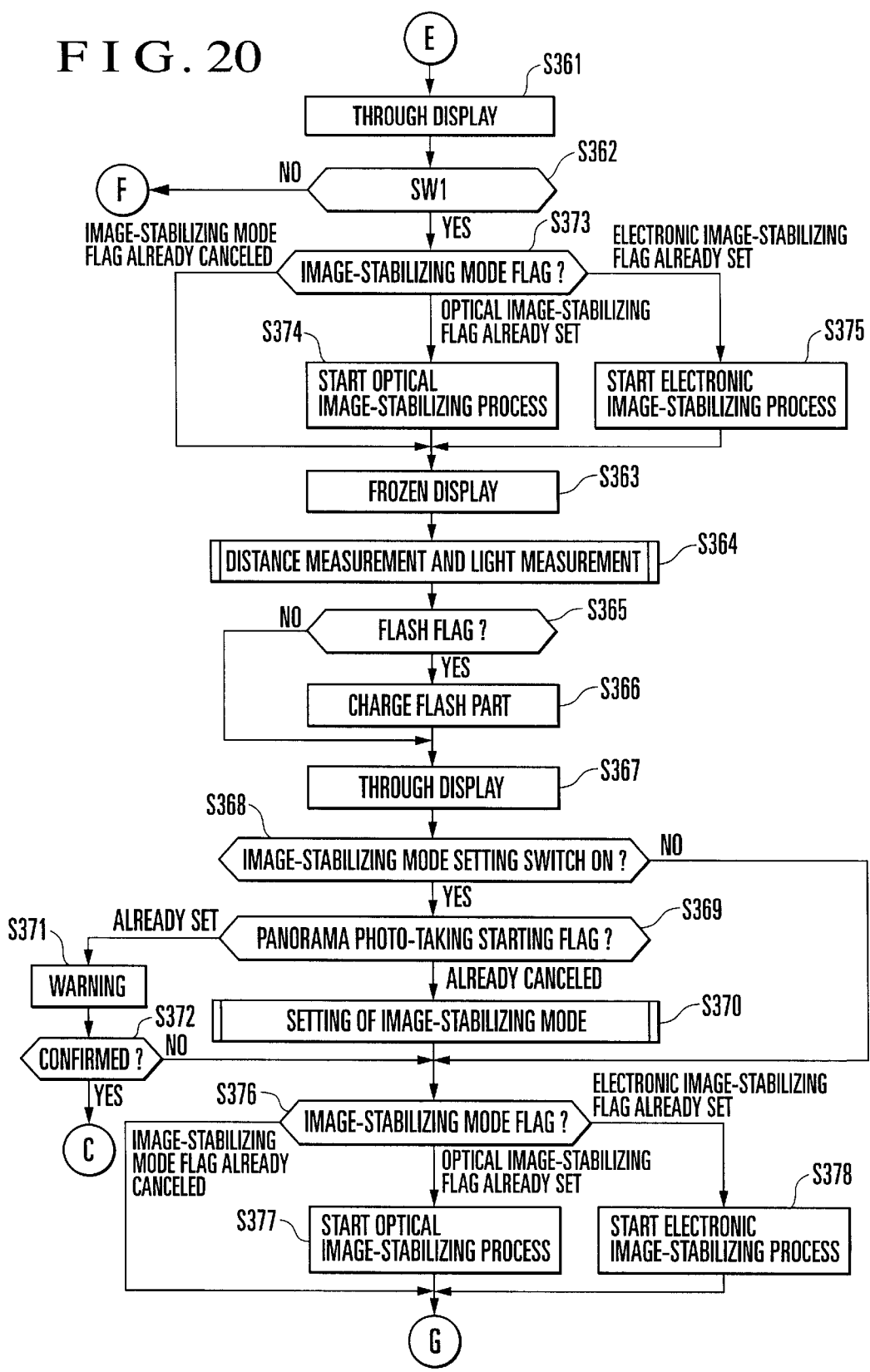

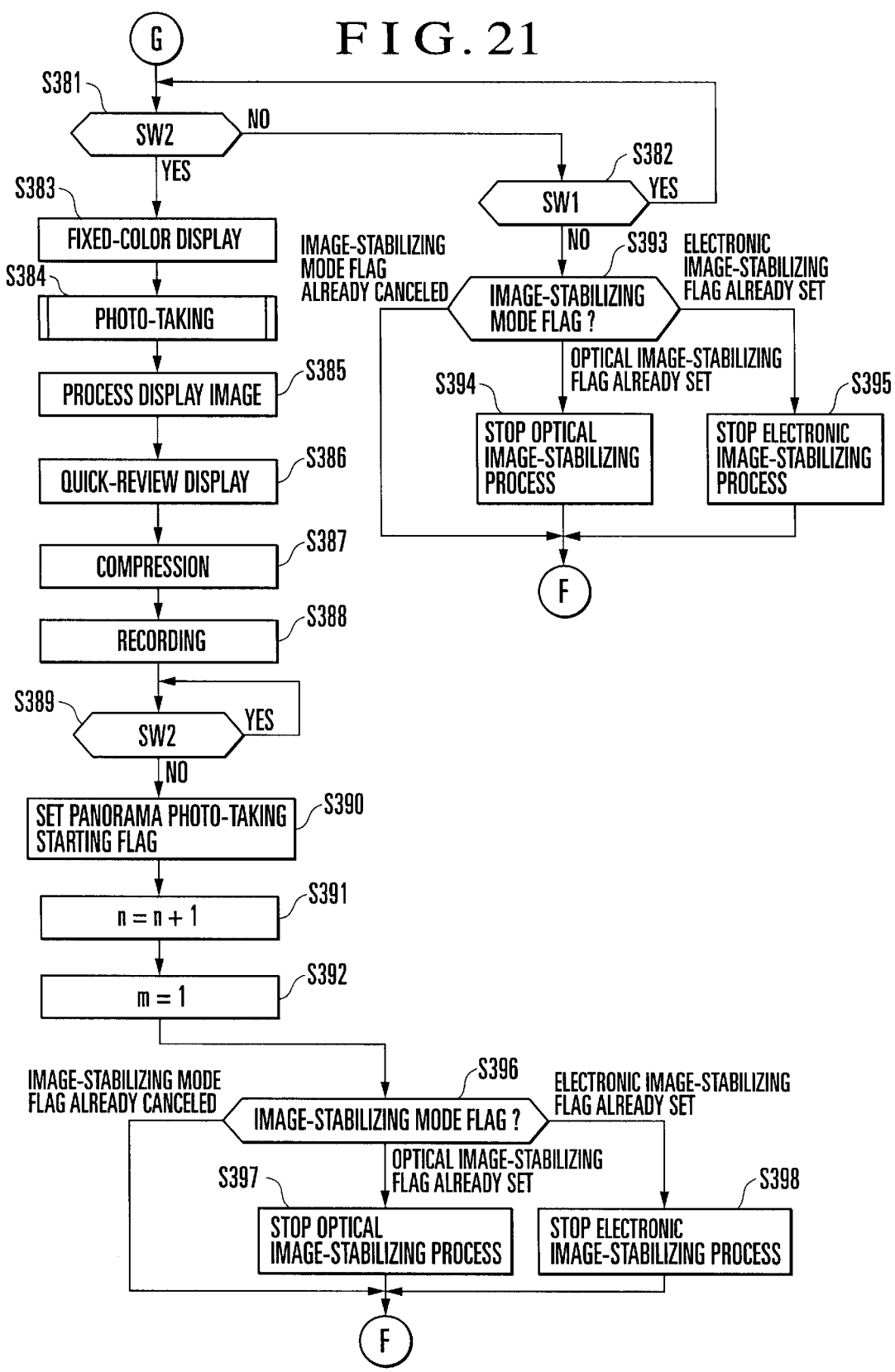

PHOTO-TAKING APPARATUS, CONTROL METHOD ADAPTED FOR THE PHOTO-TAKING APPARATUS, AND COMPUTER PROGRAM PRODUCT SUPPLYING CONTROL PROGRAM ADAPTED FOR THE PHOTO-TAKING APPARATUS

BACKGROUND OF THE INVENTION

1. Field of the Invention

The present invention relates to a photo-taking apparatus for photo-taking a still image and/or a moving image, a control method adapted for the photo-taking apparatus, and a computer program product supplying a control program adapted for the photo-taking apparatus.

2. Description of Related Art

Heretofore, image processing apparatuses, such as electronic cameras, arranged to use, as a recording medium, a memory card having a solid-state memory element and to record or reproduce a still image or a moving image on or from the memory card have already been put on the market, and electronic cameras arranged to be equipped with an electronic viewfinder, such as a color liquid crystal panel, have also been put on the market.

In each of the electronic cameras of the above-mentioned kind, since images formed before a photo-taking operation can be continuously displayed, it is possible for the user of each electronic camera to decide a composition for the photo-taking operation while viewing the displayed images, and since a photo-taken image can be reproduced and displayed immediately after the photo-taking operation, it is possible for the user to confirm the photo-taken image. In particular, some electronic apparatuses have such a highly-convenient function as to form a panorama image by combining a plurality of photo-taken images, which function is useful to the user of each electronic apparatus.

In addition, electronic cameras having an image-shake correcting function for preventing any shaken image from being photo-taken, i.e., having an image-stabilizing mode, have also been put on the market.

In the above-mentioned conventional image processing apparatus, such as an electronic camera, the user thereof, in some cases, changes the setting of the image-stabilizing mode during the process of photo-taking a panorama image. In this instance, when forming a panorama image by combining a plurality of photo-taken images, it is, in some cases, impossible to correct a difference in the amount of image-shake correction caused by the change of the setting of the image-stabilizing mode.

Further, the user of the image processing apparatus, such as an electronic camera, in some cases, changes the setting of the image-stabilizing mode, during the process of photo-taking a panorama image, between an optical image-stabilizing mode for the correction of an optical system and an electronic image-stabilizing mode for the correction of a reading-out area of photo-taken image data. In this instance, when forming a panorama image by combining a plurality of photo-taken images, it is, in some cases, impossible to correct a photo-taken image affected by the erroneous mixing of image-stabilizing modes having respective different image-shake correcting effects.

BRIEF SUMMARY OF THE INVENTION

In accordance with one aspect of the invention, there are provided a photo-taking apparatus which sets performing a plurality of correlated photo-taking operations and prevents setting of an image-stabilizing function from being changed during the plurality of correlated photo-taking operations, so that it is possible to prevent inadequate setting of the image-stabilizing function from being performed when a plurality of correlated photo-taking operations, such as in a panorama photo-taking operation, are performed, a control method adapted for the photo-taking apparatus, and a computer program product supplying a control program adapted for the photo-taking apparatus.

The above and further aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 20 is a flow chart showing processes in a part of the main routine of the operation of the image processing apparatus according to the second embodiment.

FIG. 21 is a flow chart showing processes in a part of the main routine of the operation of the image processing apparatus according to the second embodiment.

DETAILED DESCRIPTION OF THE INVENTION

Hereinafter, preferred embodiments of the invention will be described in detail with reference to the drawings.
(First Embodiment)

Figure 1:
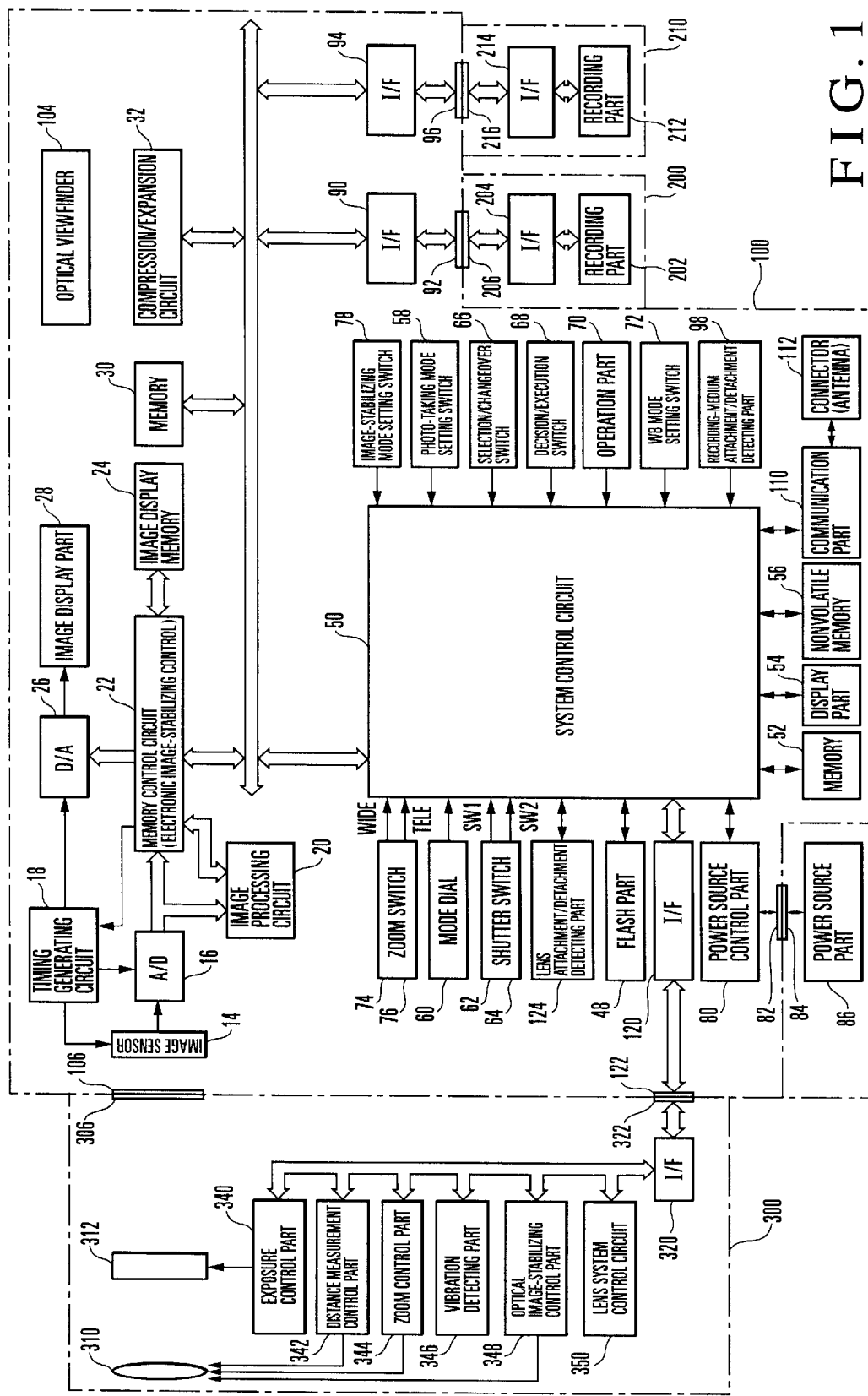
FIG. 1 is a block diagram showing the arrangement of an image processing apparatus, serving as a photo-taking apparatus, according to a first embodiment of the invention.

FIG. 1 is a block diagram showing the arrangement of an image processing apparatus, serving as a photo-taking apparatus, according to a first embodiment of the invention.

Referring to FIG. 1, reference numeral 100 denotes the image processing apparatus according to the first embodiment.

In the image processing apparatus 100, an image sensor 14 converts an optical image into an electrical signal, and an A/D converter 16 converts an analog signal output of the image sensor 14 into a digital signal.

A timing generating circuit 18 supplies a clock signal, a control signal or the like to the image sensor 14, the A/D converter 16 and a D/A converter 26, and is controlled by a memory control circuit 22 and a system control circuit 50.

An image processing circuit 20 performs a predetermined pixel interpolating processing operation, a predetermined color conversion processing operation, etc., onto data supplied from the A/D converter 16 or data supplied from the memory control circuit 22. Further, the image processing circuit 20 performs a predetermined computing processing operation using image data obtained by an image pickup operation. On the basis of a result of the predetermined computing processing operation, the system control circuit 50 performs an AF (automatic focusing) processing operation and an AE (automatic exposure) processing operation of the TTL (through-the-lens) type for controlling a distance measurement control part 342 and an exposure control part 340, and an EF (preliminary flash emission in electronic flash) processing operation. Furthermore, the image processing circuit 20 performs another predetermined computing processing operation using image data obtained by the image pickup operation, and, on the basis of a result of the predetermined computing processing operation, performs an AWB (automatic white balance) processing operation of the TTL type.

The memory control circuit 22 controls the A/D converter 16, the timing generating circuit 18, the image processing circuit 20, an image display memory 24, the D/A converter 26, a memory 30 and a compression/expansion circuit 32. Data outputted from the A/D converter 16 is written, through both the image processing circuit 20 and the memory control circuit 22 or through the memory control circuit 22 only, into the image display memory 24 or the memory 30.

Further, the memory control circuit 22 has an electronic image-stabilizing function for correcting an image shake by performing the setting of causing the timing generating circuit 10 to vary the position from which to cut out pixel data of the image sensor 14, in such a direction as to cancel the vibration of the image processing apparatus 100 according to the amount of vibration detected by a vibration detecting part 346. The electronic image-stabilizing function can be arbitrarily set or canceled according to the instruction from the system control circuit 50. Further, an image-stabilizing characteristic of the image-stabilizing function also can be arbitrarily set according to the instruction from the system control circuit 50.

An image display part 28 is composed of a TFT-LCD (thin-film transistor liquid crystal display) or the like. Image data for display written in the image display memory 24 is supplied, through the D/A converter 26, to the image display part 28 and is then displayed at the image display part 28. If image data obtained by the image pickup operation is made to be successively displayed at the image display part 28, it is possible to realize the electronic viewfinder function. Further, the image display part 28 is able to turn on and off the displaying operation thereof arbitrarily in response to an instruction from the system control circuit 50. If the displaying operation is turned off, the consumption of electric power of the image processing apparatus 100 can be reduced greatly.

The memory 30 is arranged to store a still image or a moving image obtained by the image pickup operation, and has a sufficient storage capacity for storing a predetermined number of still images or a moving image running for a predetermined time. Accordingly, even in the case of a continuous-shooting photo-taking operation in which a plurality of still images are continuously picked up or even in the case of a panorama photo-taking operation, a high-speed and large-volume image writing action can be performed onto the memory 30. Further, the memory 30 can be used as a working area for the system control circuit 50.

The compression/expansion circuit 32, which compresses or expands image data by using the adaptive discrete cosine transform (ADCT) or the like, reads image data stored in the memory 30, performs compression processing or expansion processing on the image data, and then writes the processed image data into the memory 30. Incidentally, the mode of LPEG compression using the adaptive discrete cosine transform (ADCT) is provided with, for example, a normal mode and a fine mode, which are selected according to the compression rate. In the mode of JPEG compression, image data, which has been read out of the image sensor 14 and written into the memory 30 through the A/D converter 16, the image processing circuit 20 and the memory control circuit 22, is read out of the memory 30 and is then recorded in a recording medium 200 or 210 after being compressed by the compression/expansion circuit 32 according to the set compression rate. On the other hand, in a CCDRAW mode, which is a recording mode having no JPEG compression adopted, image data is read out, as it is, for every line according to the arrangement of pixels of a color filter of the image sensor 14, and is then written into the memory 30 through the A/D converter 16 and the memory control circuit 22, and the image data written in the memory 30 is read out and recorded in the recording medium 200 or 210.

A flash part 48 has the function of projecting AF auxiliary light and the function of adjusting flash emission. Further, the flash part 48 may be provided with a mechanism for moving a light-emitting unit between a light-emission position and a stowage position (a pop-up mechanism).

The system control circuit 50 controls the whole image processing apparatus 100. A memory 52 stores therein constants, variables, programs, etc., to be used for the action of the system control circuit 50.

A display part 54, which is composed of a liquid crystal display device, a speaker, etc., displays the operating state, a message, etc., by using characters, images, sound, etc., according to the execution of a program in the system control circuit 50. The display part 54 is disposed at a single portion or at a plurality of portions in such a position as to be easy to view in the vicinity of an operation part of the image processing apparatus 100, and is composed of a combination of an LCD (liquid crystal display device), an LED (light emitting diode), a sound producing element, etc., for example. Further, the display part 54 has a part of its functions disposed inside an optical viewfinder 104.

Among display contents of the display part 54, the ones which are to be displayed on the LCD, etc., include a single-shooting/continuous-shooting photo-taking display, a self-timer display, a compression rate display, a number-of-recording-pixels display, a number-of-recording-images display, a number-of-remaining-recordable-images display, a shutter speed display, an aperture value display, an exposure compensation display, a flash display, a red-eye prevention display, a macro photography display, a buzzer setting display, a remaining-amount-of-battery-for-clock display, a remaining-amount-of-battery-for-camera display, an error display, an information display with a plurality of digits, an attachment/detachment state display for the recording media 200 and 210, a communication I/F (interface) operation display, a date-and-time display, a display indicative of the state of connection with an external computer, etc.

Further, among the display contents of the display part 54, the ones which are to be displayed inside the optical viewfinder 104 include an in-focus display, a completion-of-photo-taking-preparation display, an image-shake warning display, a flash charging display, a completion-of-flash-charging display, a shutter speed display, an aperture value display, an exposure compensation display, a recording-medium writing action display, etc.

In addition, among the display contents of the display part 54, the ones which are to be displayed on the LED or the like include an in-focus display, a completion-of-photo-taking-preparation display, an image-shake warning display, a flash charging display, a completion-of-flash-charging display, a recording-medium writing action display, a macro photo-taking setting noticing display, a secondary-battery charging state display, etc.

Further, among the display contents of the display part 54, the ones which are to be displayed by the lamp or the like include, for example, a self-timer noticing lamp, etc. The self-timer noticing lamp may be used also for AF auxiliary light.

A nonvolatile memory 56, which is electrically erasable and recordable, is composed of an EEPROM (electrically erasable and programmable read-only memory) or the like.

Operation means 60, 62, 64, 66, 68, 70, 72, 74, 76, 78 and 58 are arranged to input the various operation instruction signals to the system control circuit 50, and are composed of a combination of one or a plurality of ones of a switch, a dial, a touch panel, a pointing device using visual-line detection, a speech recognition device, etc.

Here, each of the operation means 60, 62, 64, 66, 68, 70, 72, 74, 76, 78 and 58 will be particularized.

The operation means 60 is a mode dial switch, which is capable of setting and changing the various function modes, such as photo-taking modes including an automatic photo-taking mode, a manual photo-taking mode, a panorama photo-taking mode, etc., a reproduction mode, a multiple-picture reproduction and erasure mode, a PC connection mode, etc., in addition to a power-off mode.

The operation means 62 is a shutter switch (SW1), which is arranged to be turned on by the halfway operation of a shutter button (not shown) to give an instruction for starting operations including an AF (automatic focusing) processing operation, an AE (automatic exposure) processing operation, an AWB (automatic white balance) processing operation, an EF (preliminary flash emission in electronic flash) processing operation, etc. The operation means 64 is a shutter switch (SW2), which is arranged to be turned on by the complete operation of the shutter button (not shown) to give an instruction for starting a series of operations including an exposure processing operation for writing an image signal read out of the image sensor 14 into the memory 30 through the A/D converter 16 and the memory control circuit 22, a developing processing operation using the computing operation of the image processing circuit 20 or the memory control circuit 22, and a recording processing operation for reading image data out of the memory 30, compressing the image data at the compression/expansion circuit 32, and writing the processed image data into the recording medium 200 or 210.

The operation means 66 is a selection/changeover switch, which is capable of setting the selection or changeover of the various functions in performing the photo-taking operation or reproducing operation in the panorama mode or the like. The operation means 68 is a decision/execution switch, which is capable of setting the decision or execution of the various functions in performing the photo-taking operation or reproducing operation in the panorama mode or the like.

The operation means 70 is an operation part, which is composed of the various buttons, a touch panel, etc., including a menu button, a setting button, a macro button, a multiple-picture reproduction page-break button, a flash setting button, a single-shooting/continuous-shooting/self-timer changeover button, a menu shift+(plus) button, a menu shift − (minus) button, a reproduced image shift + (plus) button, a reproduced image − (minus) button, a photo-taking image-quality selection button, an exposure compensation button, a date/time setting button, an image display ON/OFF button for setting the turning-on or turning-off of the image display part 28, a quick-review ON/OFF button for setting a quick-review function in which photo-taken image data is automatically reproduced at the image display part 28 immediately after the photo-taking operation, a compression mode switch for selecting the compression rate of the JPEG compression or for selecting the CCDRAW mode in which an image signal outputted from the image sensor 14 is digitized, without being processed, to be recorded in the recording medium 200 or 210, an AF lock switch for locking focus in the AF (automatic focusing) operation, an exposure (AE)/flash-control (FE) lock switch for locking exposure and/or locking the flash control in the AE (automatic exposure) operation, a flash setting switch for setting or canceling the action of the flash part 48, a flash-control correction switch for correcting the flash control (FE) in an over-correction fashion or in an under-correction fashion, an exposure (AE) compensation switch for compensating for the exposure control in an over-compensation fashion or in an under-compensation fashion, an ISO sensitivity setting switch for setting the ISO sensitivity of the image sensor 14, etc.

The operation means 72 is a white balance (WB) mode setting switch, which is capable of setting the various WB modes for the automatic setting, the sunlight setting, the cloudy-sky setting, the incandescent-lamp setting, the fluorescent-lamp setting, etc. The operation means 74 and 76 are zoom switches for performing the zoom operation of a photo-taking lens 310 through a zoom control part 344 of a lens unit 300. The zoom switch 74 is arranged for performing zooming toward the wide-angle end, and the zoom switch 76 is arranged for performing zooming toward the telephoto end. Incidentally, the zoom switches 74 and 76 may be formed into a unified switch.

The operation means 78 is an image-stabilizing mode setting switch, which is capable of setting the optical image-stabilizing function, setting the electronic image-stabilizing function and canceling the image-stabilizing function.

The operation means 58 is a photo-taking mode setting switch, which is capable of setting the various photo-taking modes, including a program mode, a shutter-speed priority mode, an aperture priority mode, a manual mode, a depth-of-focus priority mode (DEP mode), etc.

A power source control part 80 is composed of a battery detecting circuit, a DC-DC converter, a switch circuit for changing blocks to be energized, and is arranged to detect the attachment or detachment of a battery, the kind of a battery and the remaining amount of a battery, to control the DC-DC converter on the basis of results of the detection and an instruction from the system control circuit 50, and to supply, to the various parts including the recording medium 200 or 210, necessary voltages for necessary periods of time.

The power source control part 80 is provided with a connector 82, which is arranged to be connected with a connector 84 of a power source part 86. The power source part 86 is composed of a primary battery, such as an alkaline battery or a lithium battery, a secondary battery, such as an NiCd battery, an NiMH battery or an Li battery, an AC adapter, or the like.

The image processing apparatus 100 is provided with interfaces 90 and 94 to be associated with the recording media 200 and 210, each of which is composed of a memory card, a hard disk or the like, and connectors 92 and 96 to be connected with the recording media 200 and 210. A recording-medium attachment/detachment detecting part 98 is arranged to detect whether the recording medium 200 and/or the recording medium 210 is attached to the connector 92 and/or the connector 96.

Incidentally, in the first embodiment, the image processing apparatus 100 is provided with two channels of interfaces and connectors for the attachment of recording media. However, the image processing apparatus 100 may be provided with one channel of interface and connector or a plurality of channels of interfaces and connectors. Further, interfaces and connectors of different standards may be provided in combination. The interfaces and connectors may be the ones conforming to the standards of a PCMCIA card, a CF (compact flash) card or the like. Further, if the interfaces 90 and 94 and the connectors 92 and 96 are composed of the ones conforming to the standards of a PCMCIA card, a CF (compact flash) card or the like, when any one of the various communication cards including a LAN card, a modem card, a USB card, an IEEE1394 card, a P1284 card, an SCSI card, a PHS card, etc., is connected thereto, it is possible to transfer image data and management information annexed to the image data between the image processing apparatus 100 and a peripheral apparatus, such as a computer or a printer.

The optical viewfinder 104 makes it possible to perform a photo-taking operation with the optical viewfinder 104 only used without using the electronic viewfinder function of the image display part 28. Further, inside the optical viewfinder 104, there are disposed some of the functions of the display part 54, i.e., the in-focus display function, the image-shake warning display function, the flash charging display function, the shutter-speed display function, the aperture value display function, the exposure compensation display function, etc.

A communication part 110 has the various communication functions, including RS232C, USB, IEEE1394, P1284, SCSI, modem, LAN, wireless communication, etc. A connector or antenna 112 is used when the image processing apparatus 100 is connected to another apparatus or when wireless communication is performed.

A lens mount 106 is arranged to mechanically couple the image processing apparatus 100 with the lens unit 300. Inside the lens mount 106, there are contained the various functions for electrically connecting the image processing apparatus 100 to the lens unit 300.

An interface 120 is arranged to connect the image processing apparatus 100 to the lens unit 300 inside the lens mount 106. A connector 122 is arranged to electrically connect the image processing apparatus 100 to the lens unit 300. A lens attachment/detachment detecting part 124 is arranged to detect whether the lens unit 300 is attached to the lens mount 106 and/or the connector 122. The connector 122 has not only the function of exchanging a control signal, a state signal, a data signal, etc., between the image processing apparatus 100 and the lens unit 300, but also the function of supplying electric currents of the various voltages. Further, the connector 122 may be arranged not only to make electrical communication but also to make optical communication, audio communication, or the like.

The recording medium 200, which is composed of a memory card, a hard disk or the like, is provided with a recording part 202 composed of a semiconductor memory, a magnetic disk or the like, an interface (I/F) 204 used for communication with the image processing apparatus 100, and a connector 206 used for connection with the image processing apparatus 100.

Similarly, the recording medium 210, which is composed of a memory card, a hard disk or the like, is provided with a recording part 212 composed of a semiconductor memory, a magnetic disk or the like, an interface (I/F) 214 used for communication with the image processing apparatus 100, and a connector 216 used for connection with the image processing apparatus 100.

The lens unit 300 is of the interchangeable-lens type.

A lens mount 306 is arranged to mechanically couple the lens unit 300 with the image processing apparatus 100. Inside the lens mount 306, there are contained the various functions for electrically connecting the lens unit 300 with the image processing apparatus 100.

The lens unit 300 includes the photo-taking lens 310 and a shutter 312 having the diaphragm function. An interface 320 is arranged to connect the lens unit 300 to the image processing apparatus 100 inside the lens mount 306. A connector 322 is arranged to electrically connect the lens unit 300 to the image processing apparatus 100. The connector 322 has not only the function of exchanging a control signal, a state signal, a data signal, etc., between the lens unit 300 and the image processing apparatus 100, but also the function of supplying electric currents of the various voltages. Further, the connector 322 may be arranged not only to make electrical communication but also to make optical communication, audio communication, or the like.

The exposure control part 340, which controls the shutter 312, has the flash light adjusting function associated with the flash part 48. The distance measurement control part 342 controls the focusing of the photo-taking lens 310. The zoom control part 344 controls the zooming of the photo-taking lens 310. The exposure control part 340 and the distance measurement control part 342 are controlled by using the TTL method. Thus, on the basis of a result of computation obtained by computing the picked-up image data with the image processing circuit 20, the system control circuit 50 controls the exposure control part 340 and the distance measurement control part 342.

The vibration detecting part 346 is arranged to detect the vertical and horizontal vibrations of the photo-taking lens 310, and is composed of a vibration gyro or the like. Information on the vibrations detected by the vibration detecting part 346 is transmittable to a lens system control circuit 350. Further, such vibration information is transmittable also to the system control circuit 50 through the interface 320, the connector 322, the connector 122 and the interface 120.

An optical image-stabilizing control part 348 is arranged to perform an image-shake correction by means of a correction optical system. As an example of an image-shake correcting mechanism employed in the optical image-stabilizing control part 348, there is a mechanism having a shift-type optical system, a mechanism having a variable angle prism, or the like. The lens system control circuit 350 controls the optical image-stabilizing control part 348 to move the correction optical system in such a direction as to cancel the vibration of the photo-taking lens 310 according to the amount of vibration detected by the vibration detecting part 346.

Incidentally, there is no problem even if the system control circuit 50 itself controls, through the lens system control circuit 350, the optical image-stabilizing control part 348 to move the correction optical system in such a direction as to cancel the vibration of the photo-taking lens 310 according to the amount of vibration detected by the vibration detecting part 346. The optical image-stabilizing function can be arbitrarily set or canceled according to an instruction from the system control circuit 50 through the interface 120, the connector 122, the connector 322, the interface 320 and the lens system control circuit 350. Further, an image-stabilizing characteristic of the optical image-stabilizing function can be arbitrarily set according to an instruction from the system control circuit 50 through the interface 120, the connector 122, the connector 322, the interface 320 and the lens system control circuit 350.

The lens system control circuit 350, which controls the whole lens unit 300, has the function of a memory which stores therein constants, variables, programs, etc., for the action thereof, and the function of a nonvolatile memory which stores therein identification information, such as a number peculiar to the lens unit 300, management information, function information, such as a full aperture value, a minimum aperture value and a focal length, setting values set previously and currently, etc.

Next, the operation of the image processing apparatus 100 according to the first embodiment will be described with reference to FIG. 2 to FIGS. 16(*a*) and 16(*b*).

FIGS. 2 to 6 are flow charts showing a main routine of the operation of the image processing apparatus 100 according to the first embodiment.

Figure 2:
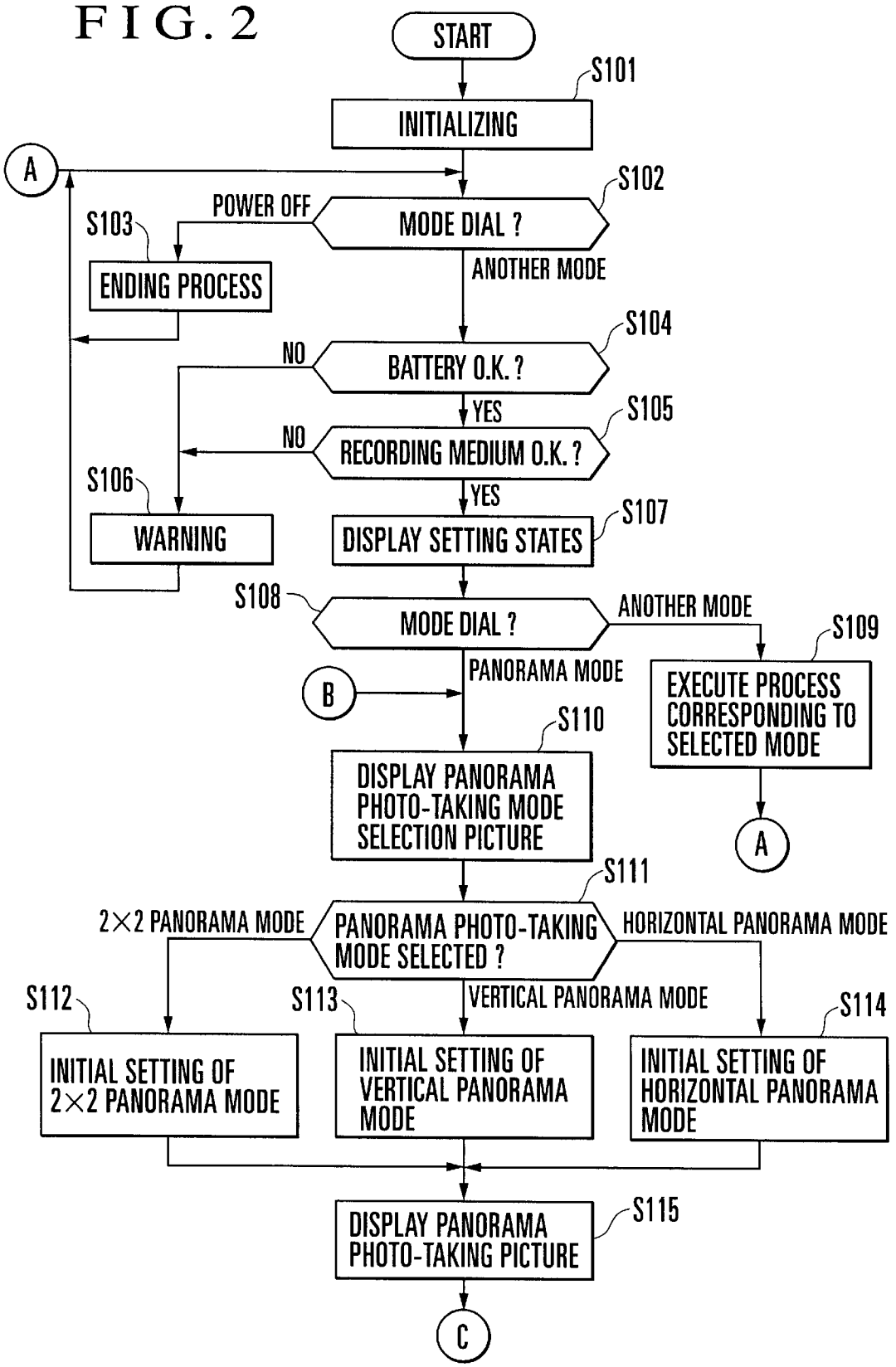
FIG. 2 is a flow chart showing processes in a part of a main routine of the operation of the image processing apparatus according to the first embodiment.

Referring first to FIG. 2, in step S101, when a power source is loaded into the image processing apparatus 100 due to the exchange of batteries, or the like, the system control circuit 50 initializes flags, control variables, etc., and performs an initializing process on each part of the image processing apparatus 100.

In step S102, the system control circuit 50 makes a check for the setting position of the mode dial 60. If it is found in the step S102 that the mode dial 60 is set to the turning-off of the power source, the procedure proceeds to step S103. In the step S103, the system control circuit 50 performs a predetermined ending process, including the operation of bringing a display of each display part into an end state, closing any protection means, such as a barrier, of the lens unit 300 to protect an image pickup part, recording, in the nonvolatile memory 56, necessary parameters, setting values and setting modes including flags, control variables, etc., causing the power source control part 80 to shut off unnecessary electric power of each part of the image processing apparatus 100, including the image display part 28, etc. Then, the procedure returns to the step S102.

If it is found in the step S102 that the mode dial 60 is set to a mode other than the power-source turning-off mode, the procedure proceeds to step S104. In the step S104, the system control circuit 50 makes a check, through the power source control part 80, to find if the remaining capacity or operating condition of the power source part 86, which is composed of batteries or the like, causes a problem with respect to the operation of the image processing apparatus 100. If it is found in the step S104 that there is a problem in the power source part 86, the procedure proceeds to step S106. In the step S106, the system control circuit 50 causes the display part 54 to make a predetermined warning display with an image or sound. Then, the procedure returns to the step S102. Incidentally, if the image displaying action of the image display part 28 is currently in an on-state, the predetermined warning display is performed also by using the image display part 28 with an image or sound.

If it is found in the step S104 that there is no problem in the power source part 86, the procedure proceeds to step S105. In the step S105, the system control circuit 50 makes a check to find if the operating condition of the recording medium 200 or 210 causes a problem with respect to the operation of the image processing apparatus 100, particularly, a recording or reproducing operation for image data on the recording medium 200 or 210. If it is found in the step S105 that there is a problem in the operating condition of the recording medium 200 or 210, the procedure proceeds to step S106. In the step S106, the system control circuit 50 causes the display part 54 to make a predetermined warning display with an image or sound. Then, the procedure returns to the step S102. Incidentally, if the image displaying action of the image display part 28 is currently in an on-state, the predetermined warning display is performed also by using the image display part 28 with an image or sound.

If it is found in the step S105 that there is no problem in the operating condition of the recording medium 200 or 210, the procedure proceeds to step S107. In the step S107, the system control circuit 50 causes the display part 54 to display the various setting states of the image processing apparatus 100 with an image or sound. Incidentally, if the image displaying action of the image display part 28 is currently in an on-state, the display of the various setting states of the image processing apparatus 100 is performed also by using the image display part 28 with an image or sound.

In the next step S108, the system control circuit 50 makes a check again for the setting position of the mode dial 60. If it is found in the step S108 that the mode dial 60 is set to a mode other than a panorama mode, the procedure proceeds to step S109. In the step S109, the system control circuit 50 executes a process corresponding to the selected mode. After the completion of the process, the procedure returns to the step S102.

If it is found in the step S108 that the mode dial 60 is set to the panorama mode, the procedure proceeds to step S110. In the step S110, the system control circuit 50 causes the image display part 28 to display a panorama photo-taking mode selection picture. Then, the user of the image processing apparatus 100 is enabled to select a desired mode from among a plurality of panorama photo-taking modes while viewing the panorama photo-taking mode selection picture displayed at the image display part 28.

The plurality of panorama photo-taking modes include a 2×2 panorama mode, a horizontal panorama mode and a vertical horizontal mode, in which a plurality of photo-taken images are combined so as to form a panorama image enlarged two-dimensionally, a panorama image enlarged horizontally and a panorama image enlarged vertically, respectively. Since each of a series of photo-taken images has, added thereto, information indicative of the positional relation thereof, it is possible for the image processing apparatus 100 itself or a computer or the like, to which the images are transferred, to form one panorama image by combining the series of photo-taken images.

Figure 10:
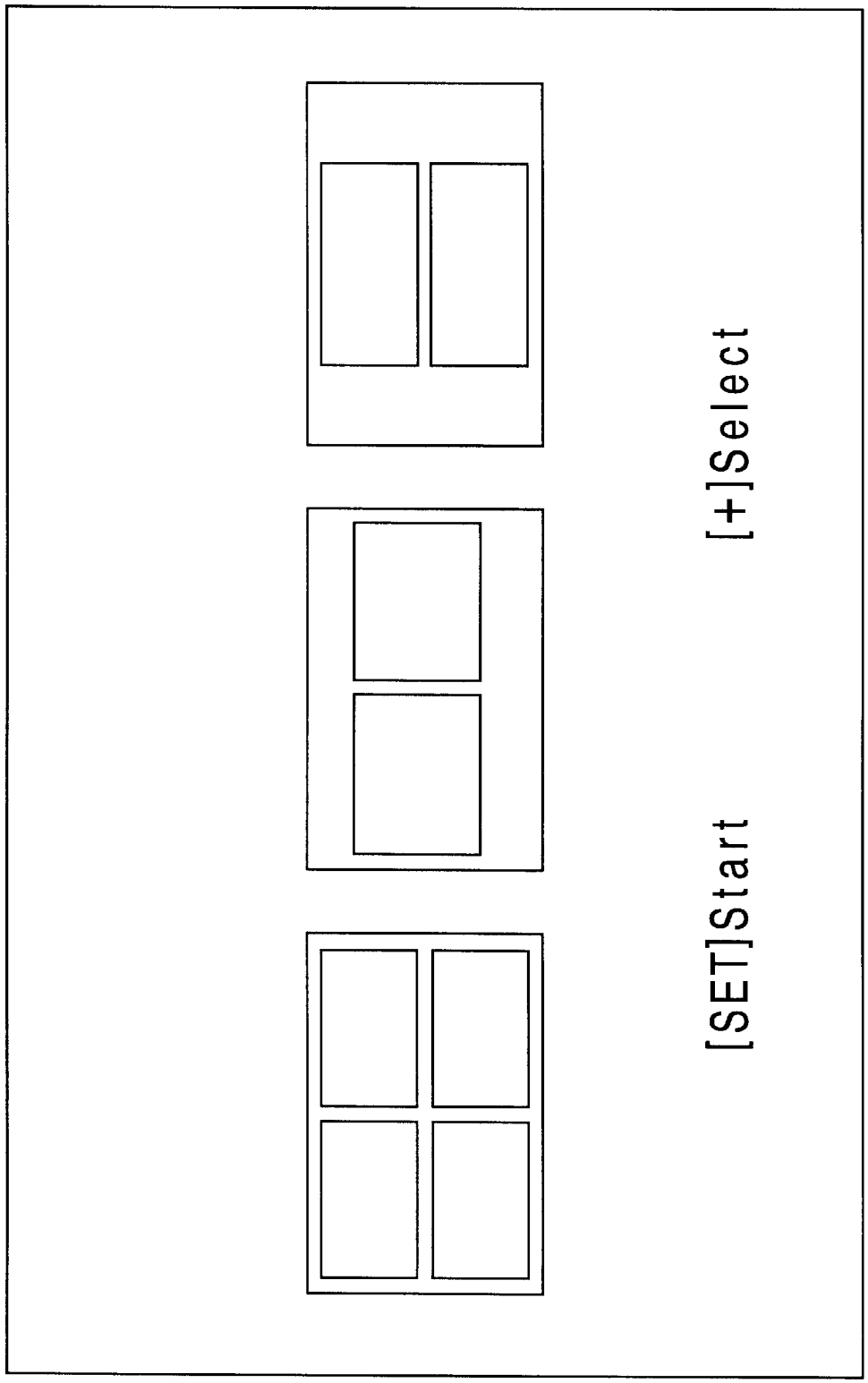
FIG. 10 is a diagram for explaining a panorama photo-taking mode selection picture.

An example of the panorama photo-taking mode selection picture is shown in FIG. 10. In FIG. 10, the left portion indicates an icon used for selecting the 2×2 panorama mode for photo-taking a two-dimensional panorama image, the middle portion indicates an icon used for selecting the horizontal panorama mode for photo-taking a horizontal panorama image, and the right portion indicates an icon used for selecting the vertical panorama mode for photo-taking a vertical panorama image. The user of the image processing apparatus 100 is enabled to select a desired panorama photo-taking mode by operating the selection/changeover switch 66 (for example, a [+] key) and to decide the panorama photo-taking mode by operating the decision/execution switch 68 (for example, a [SET] key).

In step S111, the system control circuit 50 makes a check to find which has been selected, by the operation of the selection/changeover switch 66 and that of the decision/execution switch 68, from among the 2×2 panorama mode, the vertical panorama mode and the horizontal panorama mode. If it is found in the step S111 that the 2×2 panorama mode, the vertical panorama mode or the horizontal panorama mode has been selected, the procedure proceeds to step S112, step S113 or step S114, respectively. In the step S112, step S113 or step S114, the system control circuit 50 performs the initial setting of the 2×2 panorama mode, the initial setting of the vertical panorama mode or the initial setting of the horizontal panorama mode, respectively, in such a way as to set flags, parameters, initial values of variables and memory areas and to read out a display picture serving as a user interface. Then, the procedure proceeds to step S115. In the step S115, the system control circuit 50 causes the image display part 28 to display a panorama photo-taking picture corresponding to the selected panorama photo-taking mode. Then, the procedure proceeds to step S121 in the flow chart of FIG. 3.

Figure 11A:
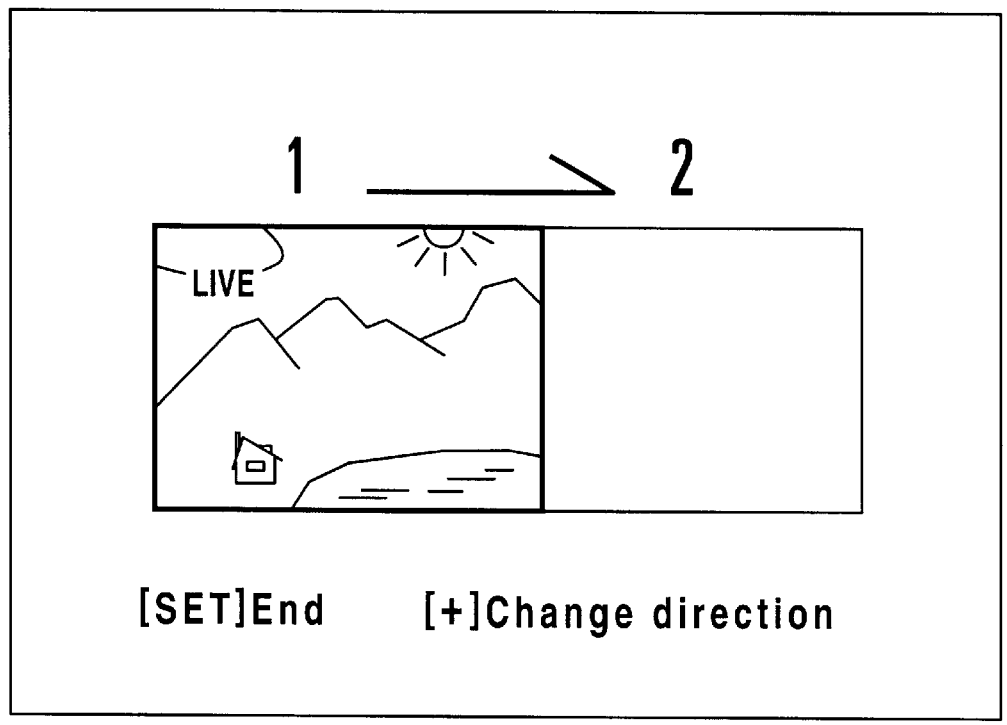
FIGS. 11(a) and 11(b) are diagrams for explaining a horizontal panorama mode photo-taking picture in an initial state thereof.
Figure 11B:
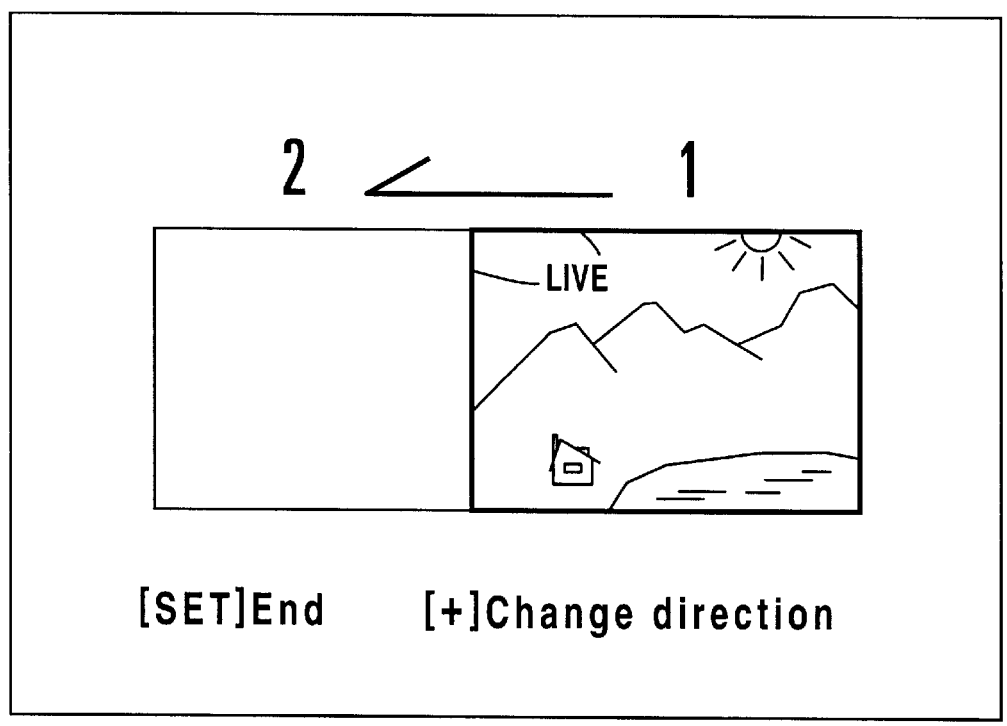
Figure 12A:
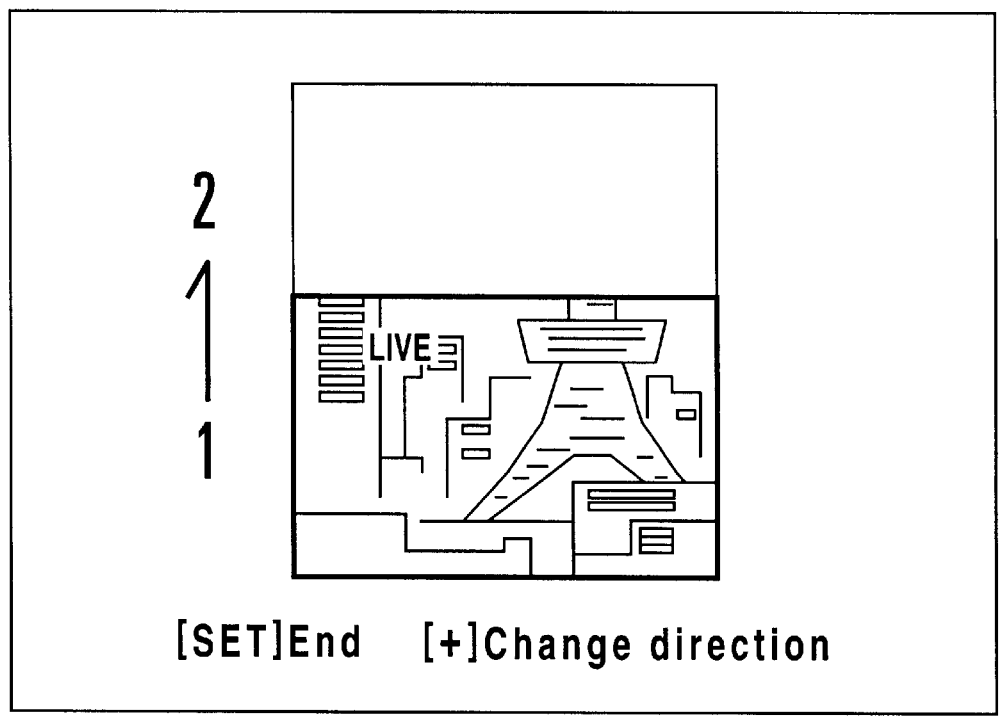
FIGS. 12(a) and 12(b) are diagrams for explaining a vertical panorama mode photo-taking picture in an initial state thereof.
Figure 12B:
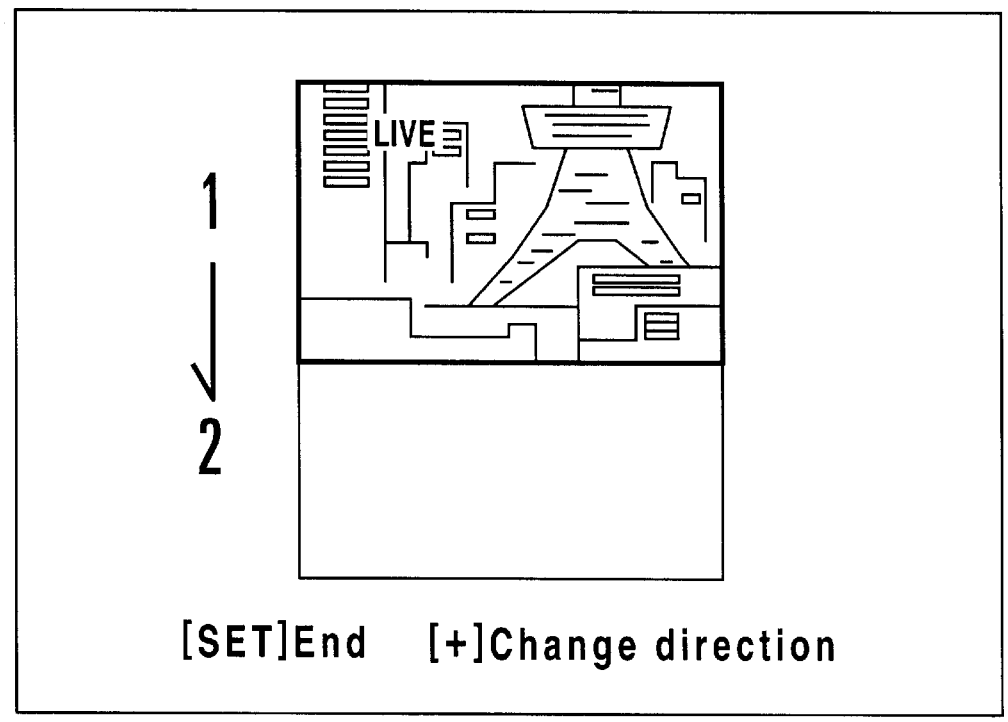
Figure 13A:
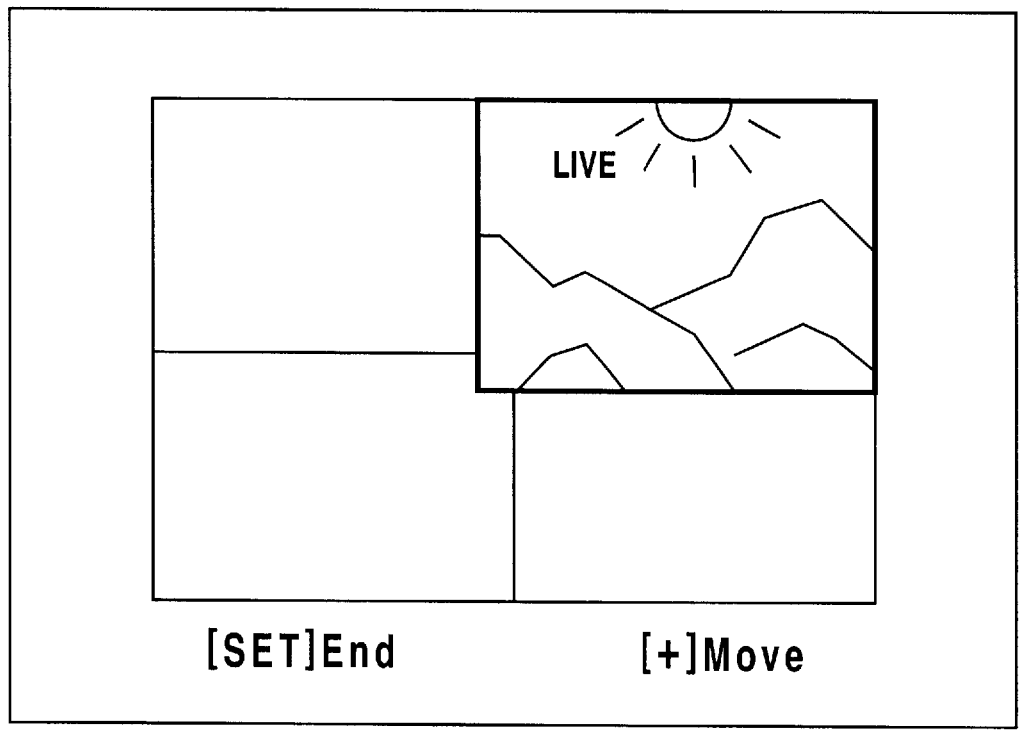
FIGS. 13(a) and 13(b) are diagrams for explaining a 2×2 panorama mode photo-taking picture.
Figure 13B:
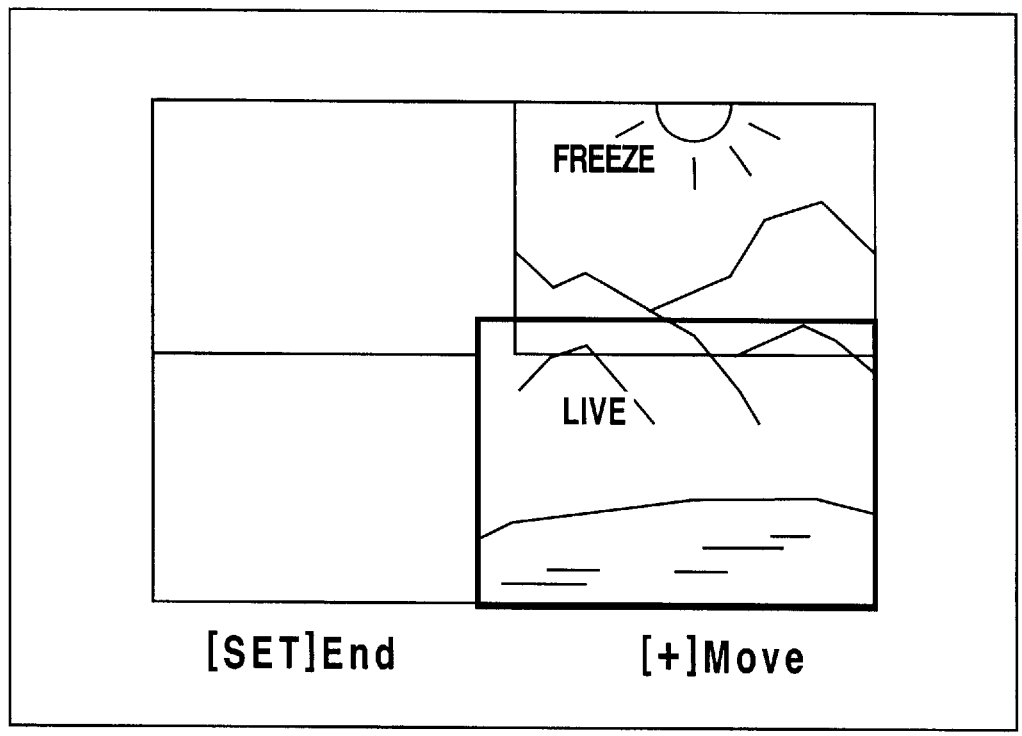

An example of the horizontal panorama mode photo-taking picture is shown in FIGS. 11(a) and 11(b), an example of the vertical panorama mode photo-taking picture is shown in FIGS. 12(a) and 12(b), and an example of the 2×2 panorama mode photo-taking picture is shown in FIGS. 13(a) and 13(b).

FIG. 11(a) shows a photo-taking picture used for forming a panorama image by continuously repeating a photo-taking operation toward the right, and FIG. 11(b) shows a photo-taking picture used for forming a panorama image by continuously repeating a photo-taking operation toward the left. In each of FIGS. 11(a) and 11(b), a through image obtained by the electronic viewfinder function is displayed at an area "1" so as to be used for photo-taking the first image of a series of images for forming a panorama image.

Further, if a photo-taking operation for the first image is not yet completed, it is possible to change over the rightward photo-taking operation (FIG. 11(a)) and the leftward photo-taking operation (FIG. 11(B)) at any time by operating the selection/changeover switch 66 (for example, the [+] key). The decision of the direction of a photo-taking operation is performed by executing the photo-taking operation for the first image by the depression of the shutter button in the state where a desired one of the display pictures shown in FIGS. 11(a) and 11(b) is displayed. Further, it is possible to bring the photo-taking operation for the horizontal panorama mode to an end by operating the decision/execution switch 68 (for example, the [SET] key).

FIG. 12(a) shows a photo-taking picture used for forming a panorama image by continuously repeating a photo-taking operation upward, and FIG. 12(b) shows a photo-taking picture used for forming a panorama image by continuously repeating a photo-taking operation downward. In each of FIGS. 12(a) and 12(b), a through image obtained by the electronic viewfinder function is displayed at an area "1" so as to be used for photo-taking the first image of a series of images for forming a panorama image. Further, if a photo-taking operation for the first image is not yet completed, it is possible to change over the upward photo-taking operation (FIG. 12(a)) and the downward photo-taking operation (FIG. 12(b)) at any time by operating the selection/changeover switch 66 (for example, the [+] key). The decision of the direction of a photo-taking operation is performed by executing the photo-taking operation for the first image by the depression of the shutter button in the state where a desired one of the display pictures shown in FIGS. 12(a) and 12(b) is displayed. Further, it is possible to bring the photo-taking operation for the vertical panorama mode to an end by operating the decision/execution switch 68 (for example, the [SET] key).

Each of FIGS. 13(a) and 13(b) shows a photo-taking picture used for forming a 2×2 panorama image by repeating a photo-taking operation two-dimensionally for four images in total in vertical and horizontal directions. The photo-taking picture shown in FIG. 13(a) is set for the first image for the 2×2 panorama image, and the photo-taking picture shown in FIG. 13(b) is set for the second image for the 2×2 panorama image. Referring to FIG. 13(a), a through image obtained by the electronic viewfinder function is displayed, for example, at an upper right area of the photo-taking picture so as to be used for photo-taking the first image for the 2×2 panorama image. When the photo-taking operation for the first image has been finished, a reproduced image of the photo-taken image is displayed, for example, at the upper right area, and a through image obtained by the electronic viewfinder function is displayed, for example, at a lower right area of the photo-taking picture so as to be used for photo-taking the second image for the 2×2 panorama image. An area at which a through image obtained by the electronic viewfinder function is displayed proceeds successively to the next area every time a photo-taking operation is performed. However, the photo-taking operation can be started from an arbitrary area, and the photo-taking operation can be re-performed at an area at which the photo-taking operation has already been performed. For that purpose, the photo-taking area can be shifted at any time by operating the selection/changeover switch 66 (for example, the [+] key). The decision of the photo-taking area for the photo-taking operation to be re-performed and the execution of that photo-taking operation are performed by executing the photo-taking operation by the depression of the shutter button in the state where a desired area is selected and displayed. Further, it is possible to bring the photo-taking operation for the 2×2 panorama mode to an end by operating the decision/execution switch 68 (for example, the [SET] key).

Figure 3:
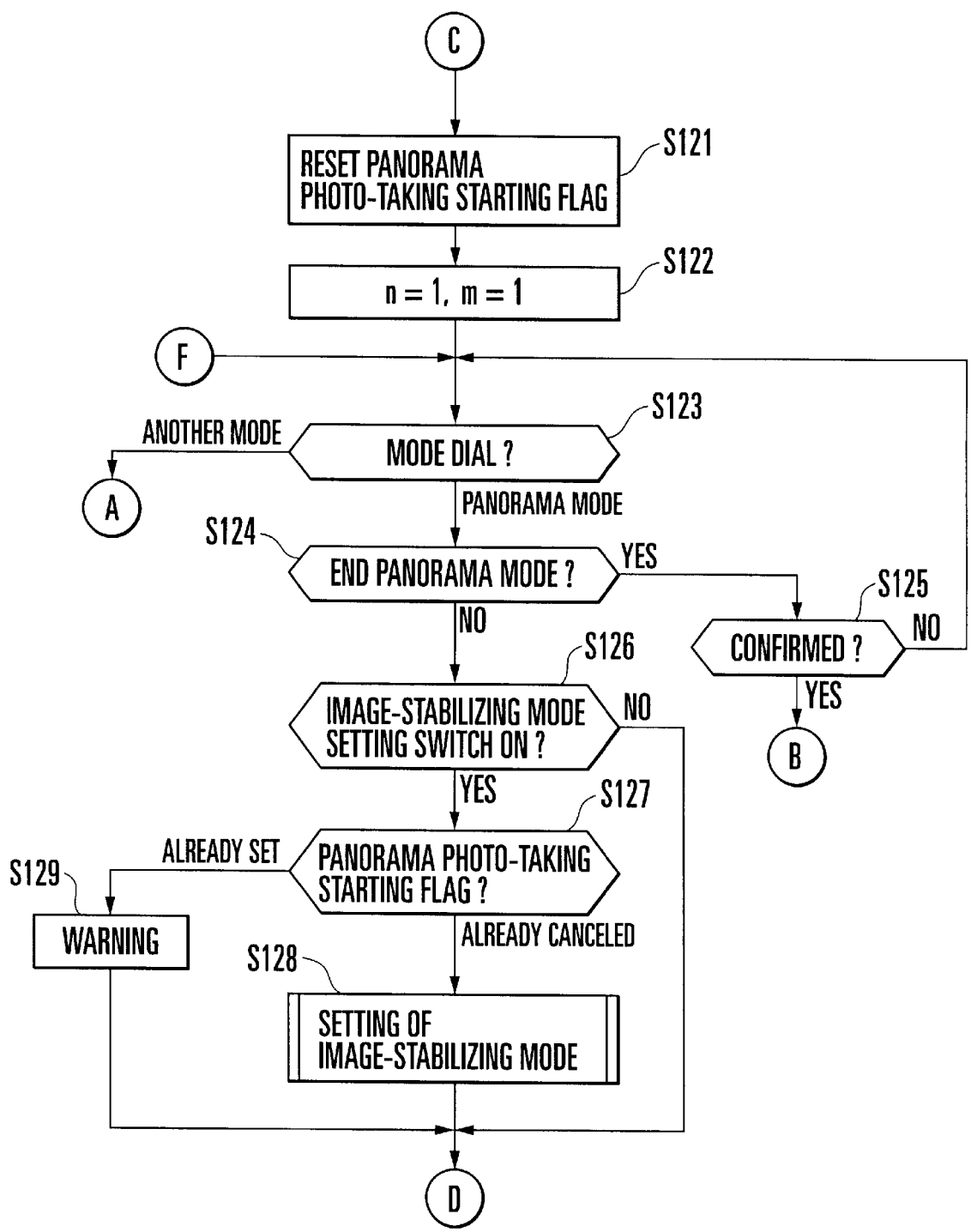
FIG. 3 is a flow chart showing processes in a part of the main routine of the operation of the image processing apparatus according to the first embodiment.

Referring to the flow chart of FIG. 3, the system control circuit 50 initializes flags and variables which have been set in an internal memory of the system control circuit 50 or the memory 52. For example, in step S121, the system control circuit 50 cancels a panorama photo-taking starting flag, and in step S122, the system control circuit 50 sets variables "m" and "n" and initializes the variables "m" and "n" to "m=1" and "n=1", respectively.

Here, the cancellation of the panorama photo-taking starting flag indicates that no images of a series of images for forming a panorama image have been photo-taken as yet. Further, the variable "n" indicates the order number of a photo-taking area in each panorama photo-taking mode. The variable "m" is used for returning a photo-taking area to the just-preceding area or canceling such returning, in re-performing a photo-taking operation in the horizontal panorama mode or the vertical panorama mode. The details of a method for using theses flags and variables will be described later herein.

In step S123, the system control circuit 50 makes a check for the setting position of the mode dial 60. If it is found in the step S123 that the mode dial 60 is set to a mode other than the panorama mode, the system control circuit 50 cancels effect flags which have been stored in the internal memory of the system control circuit 50 or the memory 52, and ends the photo-taking operation for the panorama mode. Then, the procedure returns to the step S102 in the flow chart of FIG. 2. This arrangement enables the user of the image processing apparatus 100 to end the panorama mode at any time so as to change the mode of the image processing apparatus 100 to another mode.

If it is found in the step S123 that the mode dial 60 is set to the panorama mode, the procedure proceeds to step S124. In the step S124, the system control circuit 50 makes a check to find if the end of the panorama mode has been selected by the depression of the decision/execution switch 68 (for example, the [SET] key) in the state where any one of the above-mentioned panorama photo-taking pictures is displayed on the image display part 28. If it is found in the step S124 that the end of the panorama mode has been selected, the procedure proceeds to step S125. In the step S125, the system control circuit 50 causes the image display part 28 to make a display for the confirmation of the end of the panorama mode, and makes a check to find if the confirmation of the end of the panorama mode has been selected. If it is found in the step S125 that the confirmation of the end of the panorama mode has been selected, the procedure returns to the step S110 in the flow chart of FIG. 2, where the panorama photo-taking mode selection picture is displayed.

If it is found in the step S124 that the end of the panorama mode is not selected, the procedure proceeds to step S126. In the step S126, the system control circuit 50 makes a check to find if the image-stabilizing mode setting switch 78 has been turned on. If it is found in the step S126 that the image-stabilizing mode setting switch 78 has not been turned on, the procedure proceeds to step S141 in the flow chart of FIG. 4.

If it is found in the step S126 that the image-stabilizing mode setting switch 78 has been turned on, the procedure proceeds to step S127. In the step S127, the system control circuit 50 makes a check for the state of the panorama photo-taking starting flag which has been stored in the internal memory of the system control circuit 50 or the memory 52.

If it is found in the step S127 that the panorama photo-taking starting flag has already been canceled, i.e., a photo-taking operation for the first image of a series of images for forming a panorama image is not yet performed, the procedure proceeds to step S128. In the step S128, the system control circuit 50 performs an image-stabilizing mode setting process for setting, in response to the input of the image-stabilizing mode setting switch 78, flags and parameters related to the image-stabilizing function as inputted and for storing the flags and parameters in the internal memory of the system control circuit 50 or the memory 52. The details of the image-stabilizing mode setting process (step S128) will be described later herein with reference to FIG. 9. When the image-stabilizing mode setting process (step S128) has been finished, the procedure proceeds to step S141 in the flow chart of FIG. 4.

If it is found in the step S127 that the panorama photo-taking starting flag has already been set, i.e., a photo-taking operation for the first image of a series of images for forming a panorama image has already been performed, the procedure proceeds to step S129. In the step S129, the system control circuit 50 causes the display part 54 and/or the image display part 28 to make a predetermined warning display with an image or sound. Then, the procedure proceeds to step S141 in the flow chart of FIG. 4 without performing the image-stabilizing mode setting process (step S128).

This arrangement makes it possible to prevent such a situation that the setting of the image-stabilizing mode setting switch 78 is performed in the process of photo-taking operations for a series of images for forming a panorama image and, as a result, photo-taken images which have been processed differently according to the setting/non-setting of the image-stabilizing mode and/or according to the difference in image-stabilizing mode between the optical image-stabilizing mode and the electronic image-stabilizing mode are mixed, i.e., images inadequate for forming a panorama image are combined to be photo-taken.

Incidentally, as an example of the predetermined warning display in the step S129, such a display as to indicate that the setting of each image-stabilizing mode is impossible may be made on the image-stabilizing mode setting picture. For example, as shown in FIG. 22(*c*), in a photo-taking menu picture, an item for the setting of the image-stabilizing mode may be displayed in a gray-out manner (surrounded by a line in the case of FIG. 22(*c*)), thereby making the selection of the image-stabilizing mode impossible, or the item itself for the setting of the image-stabilizing mode may be non-displayed. These are only examples, so that the warning display may be performed in the various other manners.

Figure 4:
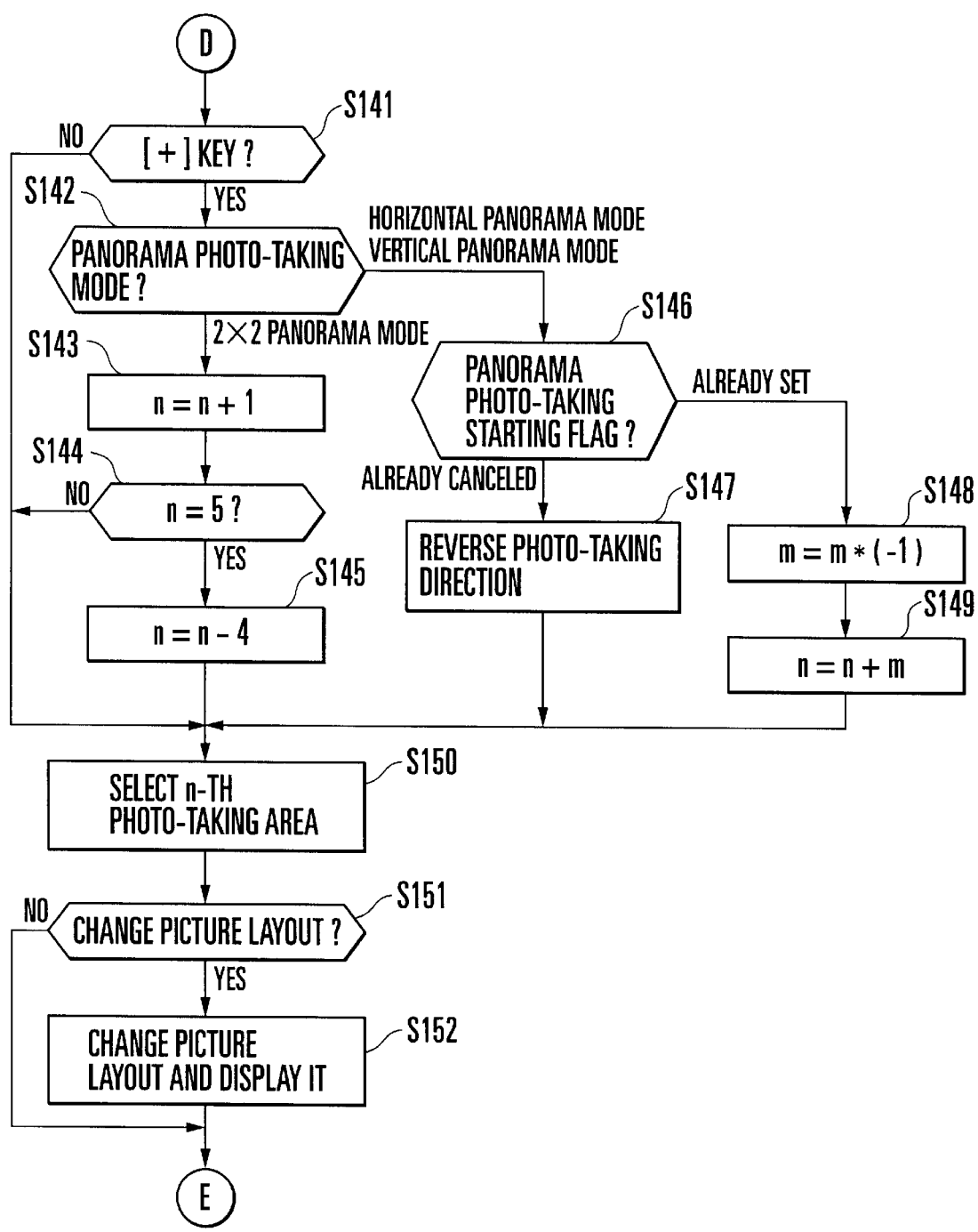
FIG. 4 is a flow chart showing processes in a part of the main routine of the operation of the image processing apparatus according to the first embodiment.

Referring to the flow chart of FIG. 4, in step S141, the system control circuit 50 makes a check to find if the selection/changeover switch 66 (for example, the [+] key) has been depressed in the state where any one of the above-mentioned panorama photo-taking pictures is displayed on the image display part 28. If it is found in the step S141 that the selection/changeover switch 66 has been depressed, the system control circuit 50 performs a predetermined process according to the setting of the panorama photo-taking mode in step S142 and subsequent steps. If it is found in the step S141 that the selection/changeover switch 66 has not been depressed, the procedure proceeds to step S150.

Specifically, in step S142, the system control circuit 50 makes a check to find if the panorama photo-taking mode is the 2×2 panorama mode or the horizontal panorama mode or the vertical panorama mode. If it is found in the step S142 that the panorama photo-taking mode is the 2×2 panorama mode, the procedure proceeds to step S143. In the step S143, the system control circuit 50 changes the variable "n" to "n=n+1" to shift the photo-taking area to the next area. In the next step S144, the system control circuit 50 makes a check to find if the variable "n" is equal to "5". If it is found in the step S144 that the variable "n" is equal to "5", the procedure proceeds to step S145. In the step S145, the system control circuit 50 changes the variable "n" to "n =n−4" to return the photo-taking area to the first area. After that, the procedure proceeds to step S150. In other words, every time the selection/changeover switch 66 (for example, the [+] key) has been depressed, the photo-taking area repeatedly shifts among four areas of the panorama photo-taking picture for the 2×2 panorama mode. For example, the photo-taking area shifts sequentially to the upper right, the lower right, the lower left, the upper left, the upper right, the lower right, . . . , of the panorama photo-taking picture.

On the other hand, if it is found in the step S142 that the panorama photo-taking mode is the horizontal panorama mode or the vertical panorama mode, the procedure proceeds to step S146. In the step S146, the system control circuit 50 makes a check for the state of the panorama photo-taking starting flag. If it is found in the step S146 that the panorama photo-taking starting flag has already been canceled, i.e., a photo-taking operation for the first image of a series of images for forming a panorama image is not yet performed, the procedure proceeds to step S147. In the step S147, the system control circuit 50 reverses the photo-taking direction adopted in the panorama photo-taking mode. After that, the procedure proceeds to step S150.

Incidentally, the reversing operation of the photo-taking direction can be repeatedly performed until a photo-taking operation for the first image is performed. Here, examples of the photo-taking directions on the panorama photo-taking picture in the horizontal panorama mode are shown in FIGS. 11(*a*) and 11(*b*). In the case of the panorama photo-taking picture shown in FIG. 11(*a*), a photo-taking operation is repeated toward the right, and in the case of the panorama photo-taking picture shown in FIG. 11(*b*), a photo-taking operation is repeated toward the left. Further, examples of the photo-taking directions on the panorama photo-taking picture in the vertical panorama mode are shown in FIGS. 12(*a*) and 12(*b*). In the case of the panorama photo-taking picture shown in FIG. 12(*a*), a photo-taking operation is repeated upward, and in the case of the panorama photo-taking picture shown in FIG. 12(*b*), a photo-taking operation is repeated downward.

Next, if it is found in the step S142 that the panorama photo-taking mode is the horizontal panorama mode or the vertical panorama mode and it is found in the step S146 that the panorama photo-taking starting flag has already been set, i.e., a photo-taking operation for the first image of a series of images for forming a panorama image has already been performed, the procedure proceeds to step S148. In the step S148, the system control circuit 50 performs a computing operation of "m=m*(−1)" , i.e., such a computing operation as to reverse the sign, as −1, +1, −1, +1, . . . , for every operation. Then, in the step S149, the system control circuit 50 changes the variable "n" to "n=n+m", i.e., performs such a computing operation as to obtain "n=n−1", "n=n+1", "n=n−1", "n=n+1", . . . , for every operation. After that, the procedure proceeds to step S150.

This arrangement makes it possible to repeatedly select one of the operation of shifting the photo-taking area to an area already subjected to a photo-taking operation, although being the last photo-taking operation only, for re-performing the photo-taking operation and the operation of canceling the operation of shifting the photo-taking area to the area already subjected to the photo-taking operation. Accordingly, the user of the image processing apparatus is enabled to perform the following operation. After a photo-taking operation on the n-th photo-taking area for forming a panorama image, the user depresses the selection/changeover switch 66 (for example, the [+] key) to confirm a condition of joining of boundary zones between a quick-review image on the (n−1)th photo-taking area and a quick-review image on the n-th photo-taking area. Then, after temporarily releasing the selection/changeover switch 66 (for example, the [+] key) to bring a display on the n-th photo-taking area into a through image, the user again depresses the selection/changeover switch 66 (for example, the [+] key) to cause the original quick-review image on the n-th photo-taking area and a through image on the (n+1)th photo-taking image to be displayed for the purpose of proceeding to the next photo-taking operation.

In addition, in a case where, when, after a photo-taking operation on the n-th photo-taking area for forming a panorama image, the user depresses the selection/changeover switch 66 (for example, the [+] key) to confirm a condition of joining of boundary zones between a quick-review image on the (n−1)th photo-taking area and a quick-review image on the n-th photo-taking area, the user decides to re-perform the photo-taking operation on the n-th photo-taking area, the user releases the selection/changeover switch 66 (for example, the [+] key) to bring a display on the n-th photo-taking area into a through image, and, then, depresses the shutter switch 64 (SW2) while keeping the through image on the n-th photo-taking area, so that the original photo-taken image on the n-th photo-taking area is replaced with a new photo-taken image. Then, the user is enabled to perform the next photo-taking operation for forming a panorama image.

In the step S150, the system control circuit 50 selects the n-th photo-taking area. Then, in step S151, the system control circuit 50 makes a check to find if it is necessary to change a picture layout according to the selected photo-taking area. If it is found in the step S151 that it is necessary to change the picture layout, the procedure proceeds to step S152. In the step S152, the system control circuit 50 causes the image display part 28 to change the picture layout and display the changed picture layout. After that, the procedure proceeds to step S161 in the flow chart of FIG. 5.

This arrangement makes it possible to display, according to necessity, a picture associated with the reversing operation of the photo-taking direction, as mentioned above, a picture associated with the change of the photo-taking area, a picture in which characters or images for explanation are renewed, or the like. Further, since, in the second or subsequent photo-taking operation, the photo-taking area already subjected to the photo-taking operation is set to a quick-review display state and the current photo-taking area shifted for the next photo-taking operation is set to a through display state, it becomes possible to display a reproduced image of the already-photo-taken image and an image to be next photo-taken, in a partially overlapping manner. This arrangement enables the user of the image processing apparatus 100 to readily decide the next photo-taking composition.

Figure 5:
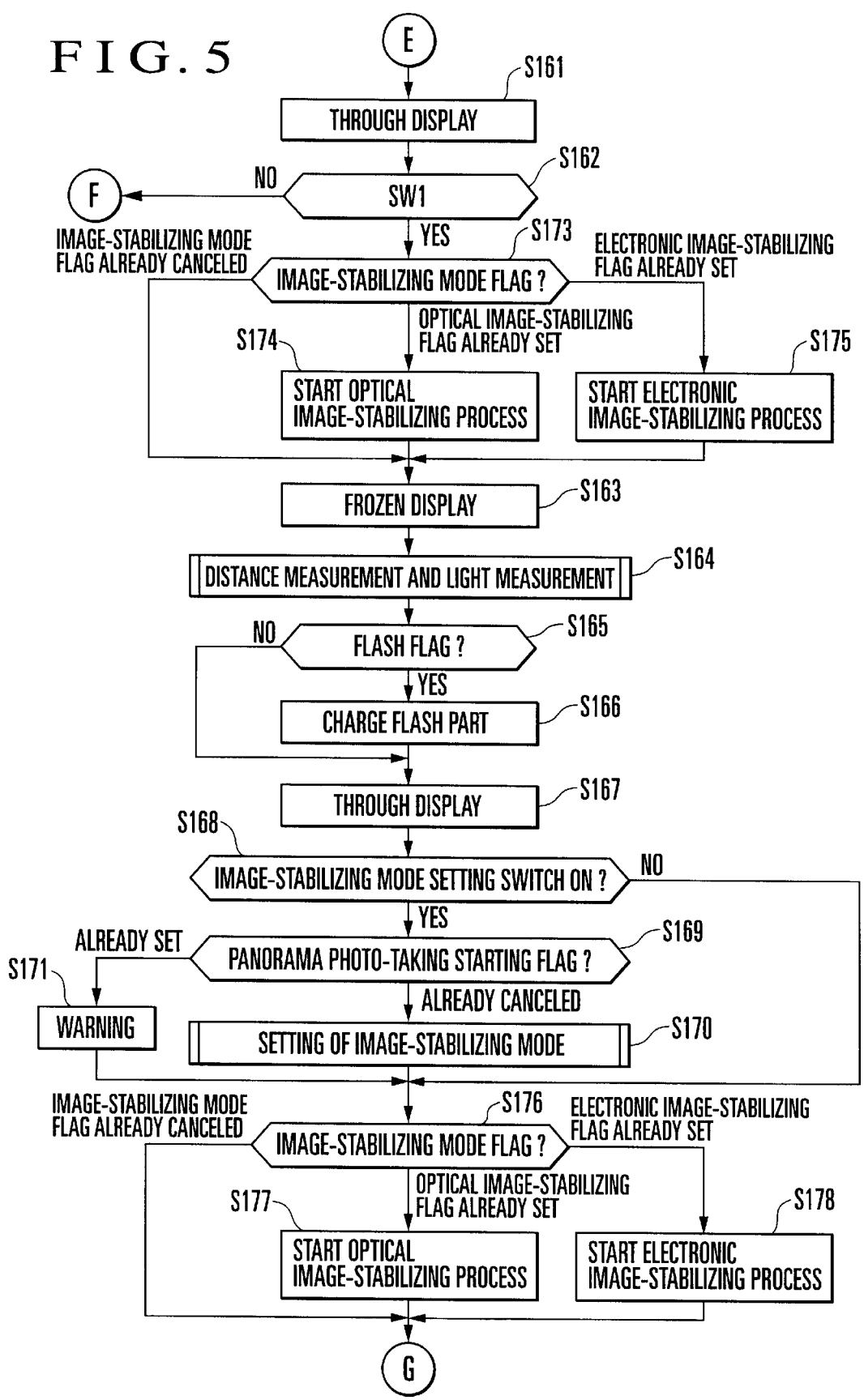
FIG. 5 is a flow chart showing processes in a part of the main routine of the operation of the image processing apparatus according to the first embodiment.

Referring to the flow chart of FIG. 5, in step S161, the system control circuit 50 brings the image display part 28 into a through display state in which photo-taken image data is successively displayed. Then, the procedure proceeds to step S162. In the through display state, image data, which has been successively written into the image display memory 24 through the image sensor 14, the A/D converter 16, the image processing circuit 20 and the memory control circuit 22, is successively displayed on the above-mentioned photo-taking area of the image display part 28 through the memory control circuit 22 and the D/A converter 26, thereby realizing the electronic viewfinder function.

In the step S162, the system control circuit 50 makes a check to find if the shutter switch 62 (SW1). is turned on. If it is found in the step S162 that the shutter switch 62 (SW1) is not turned on, the procedure returns to step S123 in the flow chart of FIG. 3. If it is found in the step S162 that the shutter switch 62 (SW1) is turned on, the procedure proceeds to step S173.

In the step S173, the system control circuit 50 makes a check for the state of an image-stabilizing mode flag stored in the internal memory of the system control circuit 50 or the memory 52. If it is found in the step S173 that the image-stabilizing mode flag has already been canceled, the procedure proceeds to step S163.

If it is found in the step S173 that an optical image-stabilizing flag has already been set, the procedure proceeds to step S174. In the step S174, the system control circuit 50 causes the optical image-stabilizing control part 348 to start an optical image-stabilizing process. Then, the procedure proceeds to step S163. If it is found in the step S173 that an electronic image-stabilizing flag has already been set, the procedure proceeds to step S175. In the step S175, the system control circuit 50 causes the memory control circuit 22 having the electronic image-stabilizing function to start an electronic image-stabilizing process. Then, the procedure proceeds to step S163.

In the step S163, the system control circuit 50 sets the display state of the image display part 28 to a frozen display state. Then, the procedure proceeds to step S164.

In the frozen display state, image data, which has been written into the image display memory 24 through the image sensor 14, the A/D converter 16, the image processing circuit 20 and the memory control circuit 22, is inhibited from being rewritten, and the last written image data is displayed on the above-mentioned photo-taking area of the image display part 28 through the memory control circuit 22 and the D/A converter 26, so that a frozen video image is displayed to be used for the electronic viewfinder function.

In step S164, the system control circuit 50 performs a distance measurement process to adjust the focus of the photo-taking lens 310 to an object, performs a light measurement process to decide an aperture value and a shutter speed, and performs a white balance process to adjust color temperature. Incidentally, in the light measurement process, if necessary, the setting of flash light emission is performed.

Further, in the step S164 for the distance measurement and light measurement process, the system control circuit 50 judges whether to execute the AE control operation and/or the AWB control operation and/or the AF control operation, according to the state of a photo-taking starting flag and/or an AE lock flag and/or a white balance mode setting flag and/or an AF lock flag stored in the internal memory of the system control circuit 50 or the memory 52, and performs the various processing operations according to the results of judgment. The details of the step S164 for the distance measurement and light measurement process will be described later herein with reference to FIG. 7.

After the completion of the step S164 for the distance measurement and light measurement process, in step S165, the system control circuit 50 makes a check for the state of a flash flag stored in the internal memory of the system control circuit 50 or the memory 52. If it is found in the step S165 that the flash flag has already been set, the procedure proceeds to step S166. In the step S166, the system control circuit 50 performs a charging operation of the flash part 48. Then, the procedure proceeds to step S167. If it is found in the step S165 that the flash flag has already been canceled, the procedure proceeds to step S167.

In the step S167, the system control circuit 50 sets the display state of the image display part 28 to the through display state. Then, the procedure proceeds to step S168. Incidentally, the through display state set in the step S167 is the same operating state as the through display state set in the step S161.

In the step S168, the system control circuit 50 makes a check to find if the image-stabilizing mode setting switch 78 has been turned on. If it is found in the step S168 that the image-stabilizing mode setting switch 78 has not been turned on, the procedure proceeds to step S176. If it is found in the step S168 that the image-stabilizing mode setting switch 78 has been turned on, the procedure proceeds to step S169. In the step S169, the system control circuit 50 makes a check for the state of the panorama photo-taking starting flag which has been stored in the internal memory of the system control circuit 50 or the memory 52.

If it is found in the step S169 that the panorama photo-taking starting flag has already been canceled, i.e., a photo-taking operation for the first image of a series of images for forming a panorama image is not yet performed, the procedure proceeds to step S170. In the step S170, the system control circuit 50 performs an image-stabilizing mode setting process for setting, in response to the input of the image-stabilizing mode setting switch 78, flags and parameters related to the image-stabilizing function as inputted and for storing the flags and parameters in the internal memory of the system control circuit 50 or the memory 52. The details of the image-stabilizing mode setting process (step S170) will be described later herein with reference to FIG. 9.

When the image-stabilizing mode setting process (step S170) has been finished, the procedure proceeds to step S176.

If it is found in the step S169 that the panorama photo-taking starting flag has already been set, i.e., a photo-taking operation for the first image of a series of images for forming a panorama image has already been performed, the procedure proceeds to step S171. In the step S171, the system control circuit 50 causes the display part 54 and/or the image display part 28 to make a predetermined warning display with an image or sound. Then, the procedure proceeds to step S176.

This arrangement makes it possible to prevent such a situation that the setting of the image-stabilizing mode setting switch 78 is performed in the process of photo-taking operations for a series of images for forming a panorama image and, as a result, photo-taken images which have been processed differently according to the setting/non-setting of the image-stabilizing mode and/or according to the difference in image-stabilizing mode between the optical image-stabilizing mode and the electronic image-stabilizing mode are mixed, i.e., images inadequate for forming a panorama image are combined to be photo-taken.

In the step S176, the system control circuit 50 makes a check for the state of the image-stabilizing mode flag stored in the internal memory of the system control circuit 50 or the memory 52. If it is found in the step S176 that the image-stabilizing mode flag has already been canceled, the procedure proceeds to step S181 in the flow chart of FIG. 6.

If it is found in the step S176 that the optical image-stabilizing flag has already been set, the procedure proceeds to step S177. In the step S177, the system control circuit 50 causes the optical image-stabilizing control part 348 to start the optical image-stabilizing process. Then, the procedure proceeds to step S181 in the flow chart of FIG. 6. If it is found in the step S176 that the electronic image-stabilizing flag has already been set, the procedure proceeds to step S178. In the step S178, the system control circuit 50 causes the memory control circuit 22 having the electronic image-stabilizing function to start the electronic image-stabilizing process. Then, the procedure proceeds to step S181 in the flow chart of FIG. 6.

Figure 6:
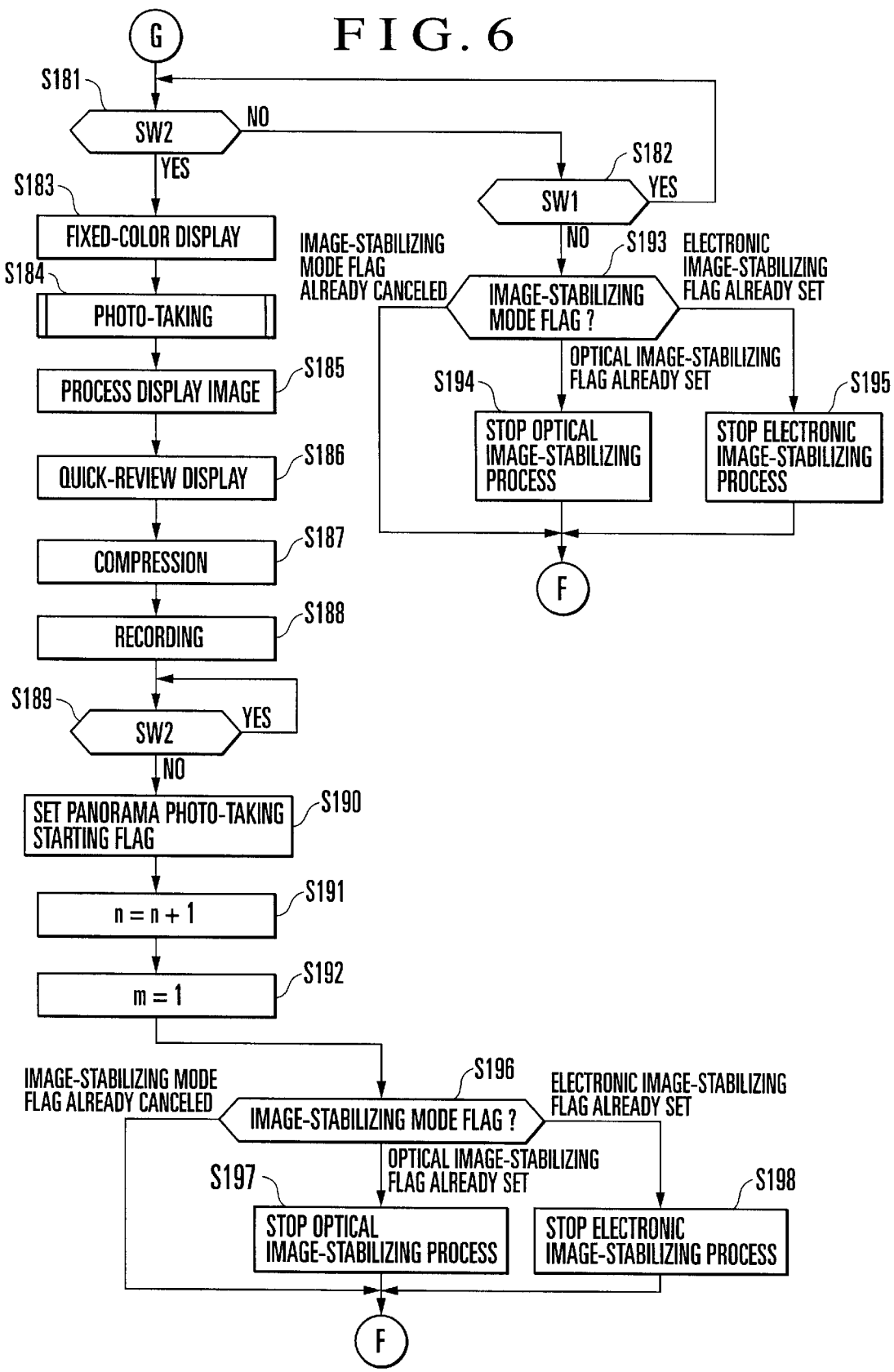
FIG. 6 is a flow chart showing processes in a part of the main routine of the operation of the image processing apparatus according to the first embodiment.

Referring to the flow chart of FIG. 6, in the step S181, the system control circuit 50 makes a check to find if the shutter switch 64 (SW2) has been turned on. If it is found in the step S181 that the shutter switch 64 (SW2) has not been turned on, the procedure proceeds to step S182. In the step S182, the system control circuit 50 makes a check to find if the shutter switch 62 (SW1) has been turned off. If it is found in the step S182 that the shutter switch 62 (SW1) has been turned off, the procedure proceeds to step S193.

In the step S193, the system control circuit 50 makes a check for the state of the image-stabilizing mode flag stored in the internal memory of the system control circuit 50 or the memory 52. If it is found in the step S193 that the image-stabilizing mode flag has already been canceled, the procedure returns to step S123 in the flow chart of FIG. 3.

If it is found in the step S193 that the optical image-stabilizing flag has already been set, the procedure proceeds to step S194. In the step S194, the system control circuit 50 causes the optical image-stabilizing control part 348 to stop the optical image-stabilizing process. Then, the procedure returns to step S123 in the flow chart of FIG. 3. If it is found in the step S193 that the electronic image-stabilizing flag has already been set, the procedure proceeds to step S195. In the step S195, the system control circuit 50 causes the memory control circuit 22 having the electronic image-stabilizing function to stop the electronic image-stabilizing process. Then, the procedure returns to step S123 in the flow chart of FIG. 3.

If it is found in the step S181 that the shutter switch 64 (SW2) has been turned on, the procedure proceeds to step S183. In the step S183, the system control circuit 50 sets the display state of the image display part 28 to a fixed-color display state. Then, the procedure proceeds to step S184. In the fixed-color display state, instead of the photo-taken image data written into the image display memory 24 through the image sensor 14, the A/D converter 16, the image processing circuit 20 and the memory control circuit 22, image data of a fixed color is displayed on the above-mentioned photo-taking area of the image display part 28 through the memory control circuit 22 and the D/A converter 26, so that a video image of the fixed color is displayed to be used for the electronic viewfinder function.

In the step S184, the system control circuit 50 performs a photo-taking process composed of an exposure process in which photo-taken image data is written into the memory 30 through the image sensor 14, the A/D converter 16, the image processing circuit 20 and the memory control circuit 22 or through the image sensor 14, the A/D converter 16 and the memory control circuit 22, and a developing process in which the image data written in the memory 30 is read out to be subjected to the various processing operations using the memory control circuit 22 and, according to necessity, the image processing circuit 20. The details of the photo-taking process will be described later herein with reference to FIG. 8.

In step S185, the system control circuit 50 reads out image data written in the memory 30 in the step S184 for the photo-taking process, and, after performing a vertical adding process or a color process on the image data according to necessity, transfers a display image corresponding to the image data to the image display memory 24 through the memory control circuit 22.

In step S186, the system control circuit 50 sets the display state of the image display part 28 to a quick-review display state. Then, the procedure proceeds to step S187. In the quick-review display state, the image data transferred to the image display memory 24 in the step S185 for the display image process is displayed on the above-mentioned photo-taking area of the image display part 28 through the memory control circuit 22 and the D/A converter 26, thereby realizing the electronic viewfinder function for automatically reproducing a photo-taken image.

In step S187, the system control circuit 50 reads out photo-taken image data written in the memory 30 and performs the various image processing operations by means of the memory control circuit 22 and, according to necessity, the image processing circuit 20, and, further, performs a pixel squaring process according to necessity and performs an image compressing process by means of the compression/expansion circuit 32 according to the set mode. In the next step S188, the system control circuit 50 executes a recording process for writing image data into the recording medium 200 or 210, such as a memory card or compact flash card, through the interface 90 or 94 and the connector 92 or 96. In this instance, in a case where the image display part 28 is in an on-state, during a period for which a writing operation into the recording medium 200 or 210 is being performed, an indication indicating that the writing operation is in process, such as an indication of "BUSY", is displayed on the image display part 28. In addition, at the display part 54, an indication indicative of the process of the writing operation into the recording medium 200 or 210, such as a blinking indication by an LED, is also performed.

The system control circuit 50 continues to cause the image display part 28 to perform the quick-review display, until it is found in step S189 that the shutter switch 64 (SW2) is released from the depression thereof. This arrangement enables the user to carefully confirm a photo-taken image while continuing depressing the shutter switch 64 (SW2).

If it is found in step S189 that the shutter switch 64 (SW2) is released from the depression thereof, the procedure proceeds to step S190. In the step S190, the system control circuit 50 sets the panorama photo-taking starting flag, thereby making it clear that a photo-taking operation for the first image in a series of images for forming a panorama image has already been performed.

This arrangement makes it possible to inhibit the photo-taking direction from being reversed after the photo-taking operation for the first image in the horizontal panorama mode or the vertical panorama mode has been performed, as mentioned in the step S146.

Further, that arrangement makes it possible to inhibit the setting of the image-stabilizing mode from being changed after the photo-taking operation for the first image in a series of images for forming a panorama image has been performed, as mentioned in the step S127.

In step S191, the system control circuit 50 changes the variable "n" to "n=n+1" so as to shift the photo-taking area to the next area. In step S192, the system control circuit 50 initializes the variable "m" to "m=1". Then, the procedure proceeds to step S196.

In the step S196, the system control circuit 50 makes a check for the state of the image-stabilizing mode flag stored in the internal memory of the system control circuit 50 or the memory 52. If it is found in the step S196 that the image-stabilizing mode flag has already been canceled, the procedure returns to step S123 in the flow chart of FIG. 3. Then, the system control circuit 50 repeats a series of photo-taking processes for forming a panorama image.

If it is found in the step S196 that the optical image-stabilizing flag has already been set, the procedure proceeds to step S197. In the step S197, the system control circuit 50 causes the optical image-stabilizing control part 348 to stop the optical image-stabilizing process. Then, the procedure returns to step S123 in the flow chart of FIG. 3, thereafter, repeating a series of photo-taking processes for forming a panorama image. If it is found in the step S196 that the electronic image-stabilizing flag has already been set, the procedure proceeds to step S198. In the step S198, the system control circuit 50 causes the memory control circuit 22 having the electronic image-stabilizing function to stop the electronic image-stabilizing process. Then, the procedure returns to step S123 in the flow chart of FIG. 3, thereafter, repeating a series of photo-taking processes for forming a panorama image.

As mentioned above, after the procedure returns to the step S123 as a result of the release from the depression of the shutter switch 64 (SW2), the system control circuit 50 shifts the photo-taking area to the next area in the step S150, and sets the photo-taking areas subjected to the photo-taking operations, including the just-preceding photo-taking operation, to the quick-review display state, and the next photo-taking area to the through display state in the step S152, in such a manner that a photo-taken image and an image to be next photographed overlap each other in part. Accordingly, it is possible for the user to easily perform a joining photo-taking operation for a panorama image.

Figure 15A:
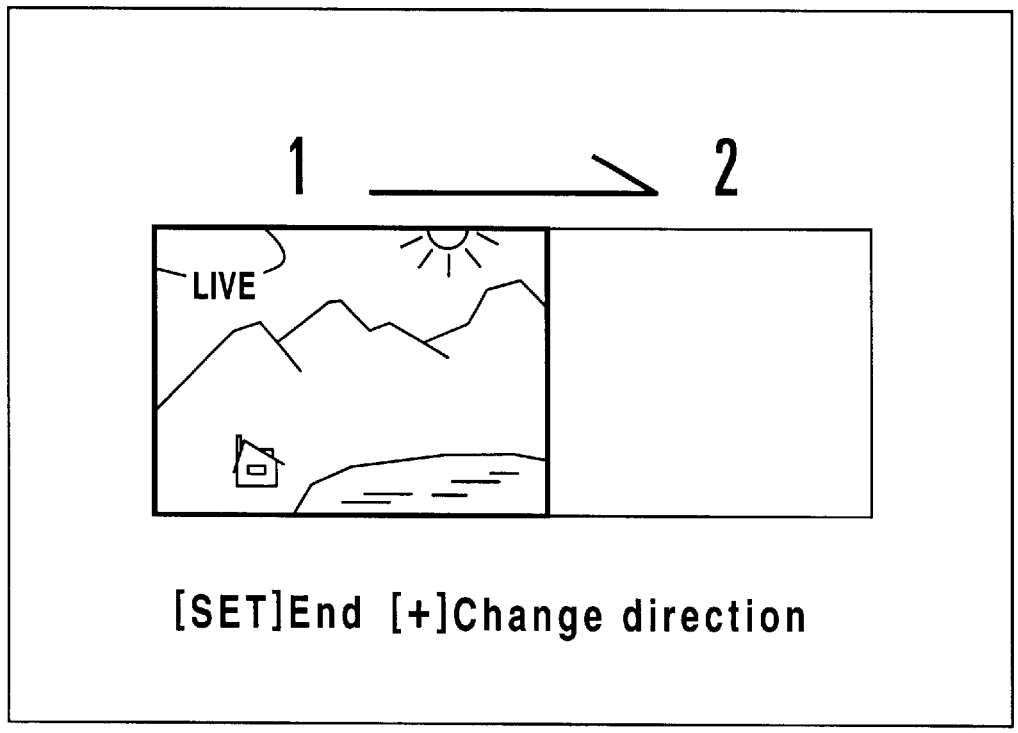
FIGS. 15(a) and 15(b) are diagrams for explaining the horizontal panorama mode photo-taking picture.
Figure 15B:
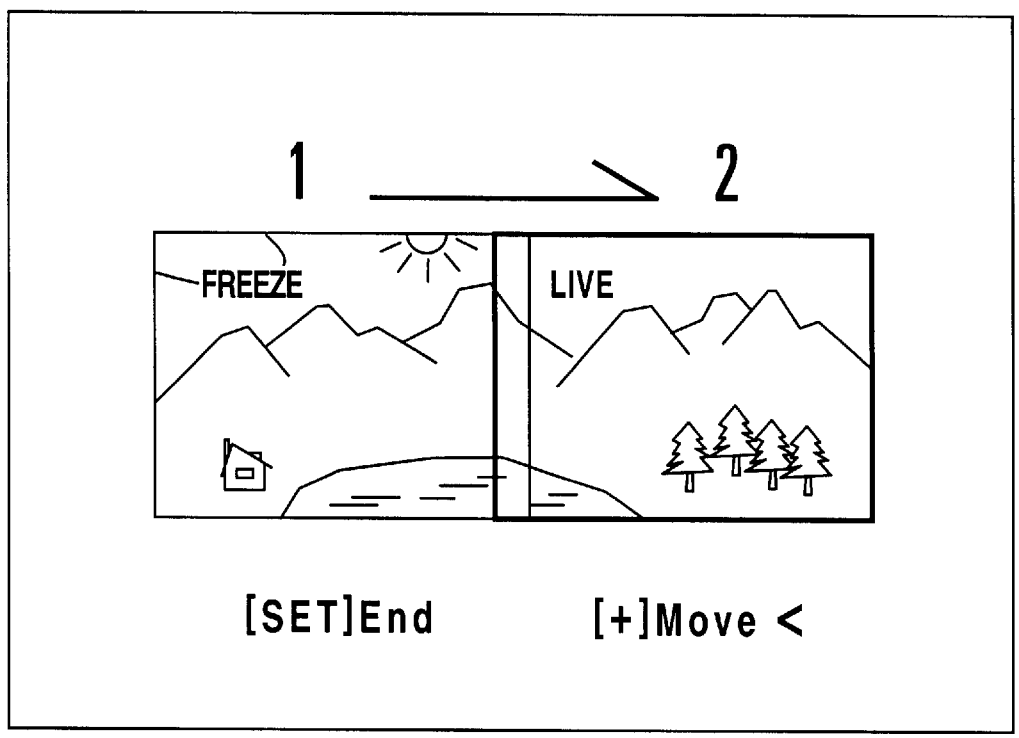

Here, photo-taking pictures obtained before and after a photo-taking operation for the n-th image in the horizontal panorama mode are shown, by way of example, in FIGS. 15(a) and 15(b). FIG. 15(a) shows the photo-taking picture obtained before the photo-taking operation for the first image, and FIG. 15(b) shows the photo-taking picture obtained with the shutter switch 64 (SW2) released from the depression thereof after the photo-taking operation for the first image. Incidentally, although not shown in any figures, such a photo-taking picture is obtained that the photo-taking area for the first image shown in FIG. 15(a) is set to the quick-review display state, until the shutter switch 64 (SW2) is released from the depression thereof after the photo-taking operation for the first image.

Figure 16A:
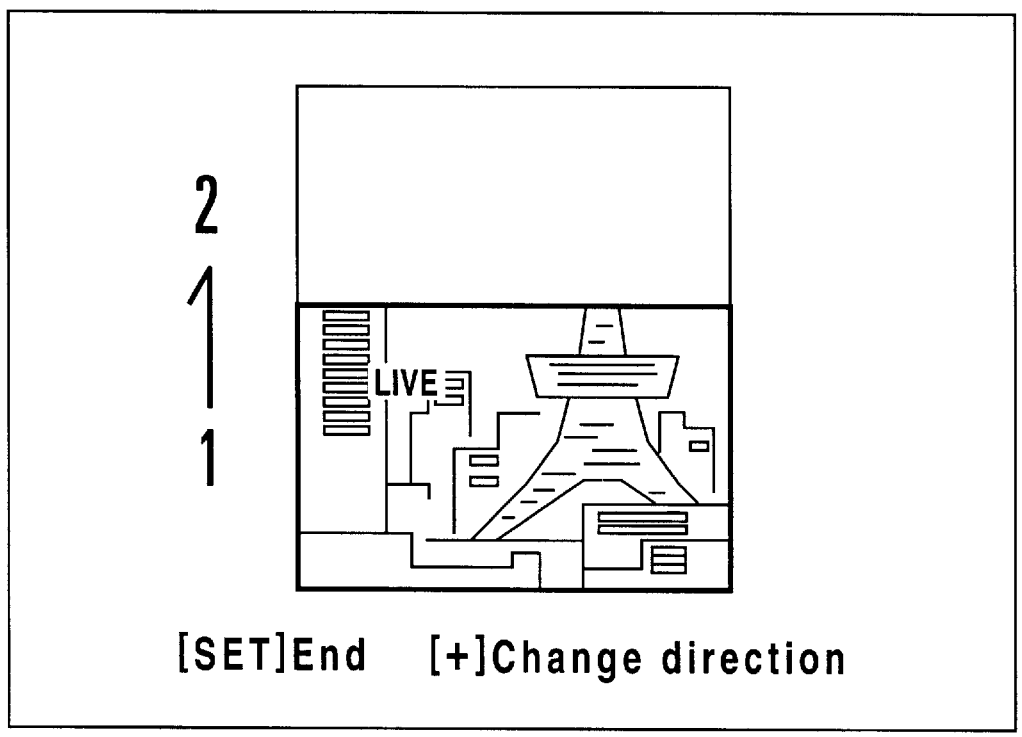
FIGS. 16(a) and 16(b) are diagrams for explaining the vertical panorama mode photo-taking picture.
Figure 16B:
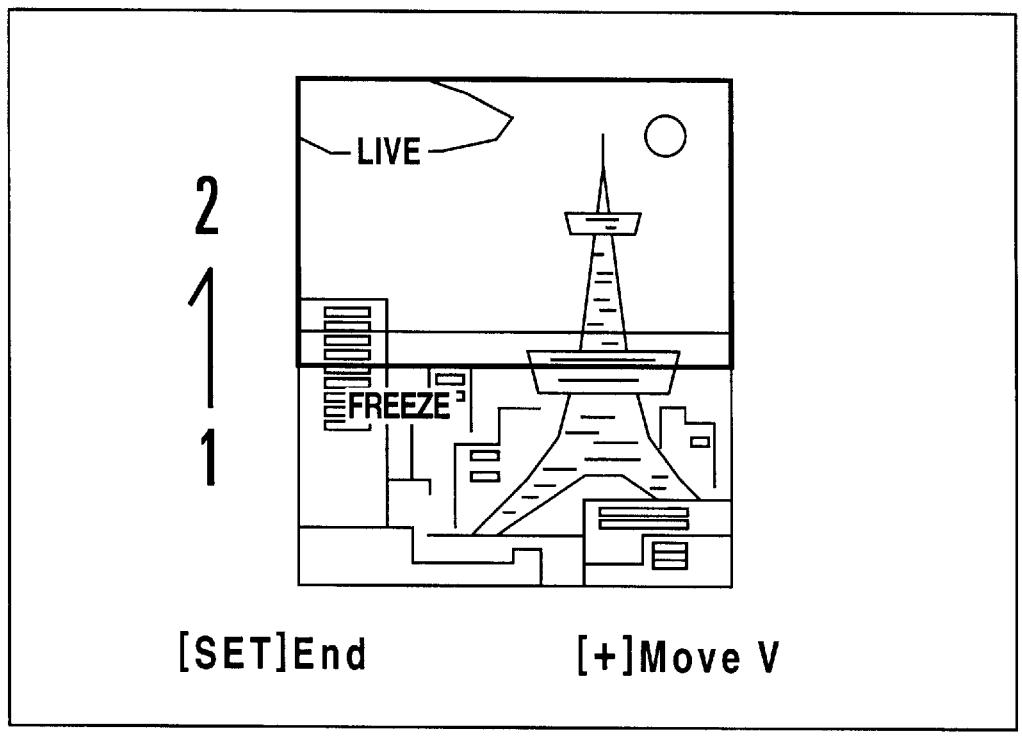

Further, photo-taking pictures obtained before and after a photo-taking operation for the n-th image in the vertical panorama mode are shown, by way of example, in FIGS. 16(a) and 16(b). FIG. 16(a) shows the photo-taking picture obtained before the photo-taking operation for the first image, and FIG. 16(b) shows the photo-taking picture obtained with the shutter switch 64 (SW2) released from the depression thereof after the photo-taking operation for the first image. Incidentally, although not shown in any figures, such a photo-taking picture is obtained that the photo-taking area for the first image shown in FIG. 16(a) is set to the quick-review display state, until the shutter switch 64 (SW2) is released from the depression thereof after the photo-taking operation for the first image.

Figure 14A:
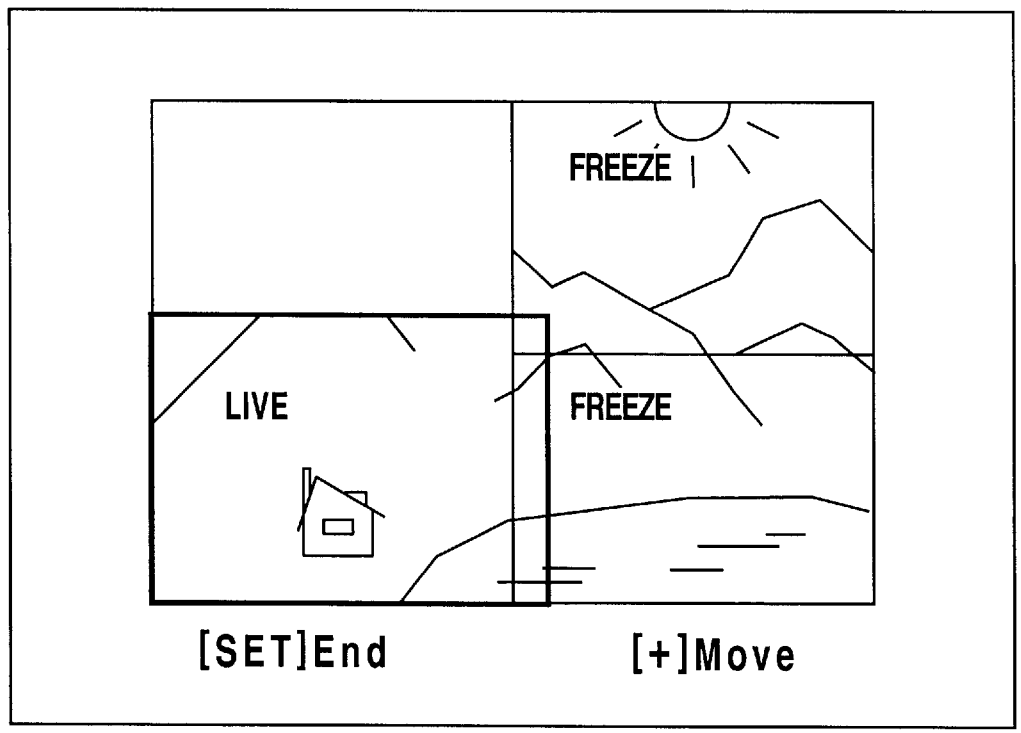
FIGS. 14(a) and 14(b) are diagrams for explaining the 2×2 panorama mode photo-taking picture.
Figure 14B:
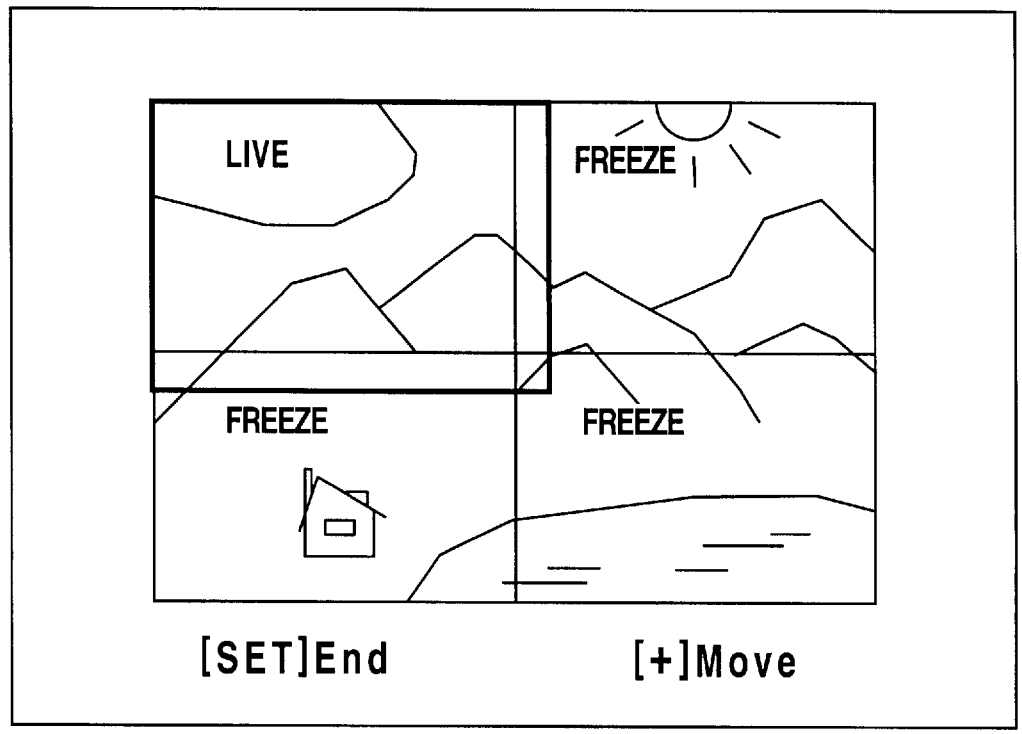

In addition, photo-taking pictures obtained before and after a photo-taking operation for the n-th image in the 2×2 panorama mode are shown, by way of example, in FIGS. 13(a) and 13(b) and FIGS. 14(a) and 14(b). FIG. 13(a) shows the photo-taking picture obtained before the photo-taking operation for the first image, and FIG. 13(b) shows the photo-taking picture obtained with the shutter switch 64 (SW2) released from the depression thereof after the photo-taking operation for the first image, i.e., the photo-taking picture obtained before the photo-taking operation for the second image. Then, FIG. 14(a) shows the photo-taking picture obtained with the shutter switch 64 (SW2) released from the depression thereof after the photo-taking operation for the second image, i.e., the photo-taking picture obtained before the photo-taking operation for the third image, and FIG. 14(b) shows the photo-taking picture obtained with the shutter switch 64 (SW2) released from the depression thereof after the photo-taking operation for the third image, i.e., the photo-taking picture obtained before the photo-taking operation for the fourth image. Incidentally, although not shown in any figures, such a photo-taking picture is obtained that the photo-taking area for the n-th image shown in FIG. 13(a), 13(b), 14(a) or 14(b) is set to the quick-review display state, until the shutter switch 64 (SW2) is released from the depression thereof after the photo-taking operation for the n-th image. With the shutter switch 64 (SW2) released from the depression thereof, the next photo-taking area, i.e., the photo-taking area for the (n+1)th image, is set to the through display state.

Figure 7:
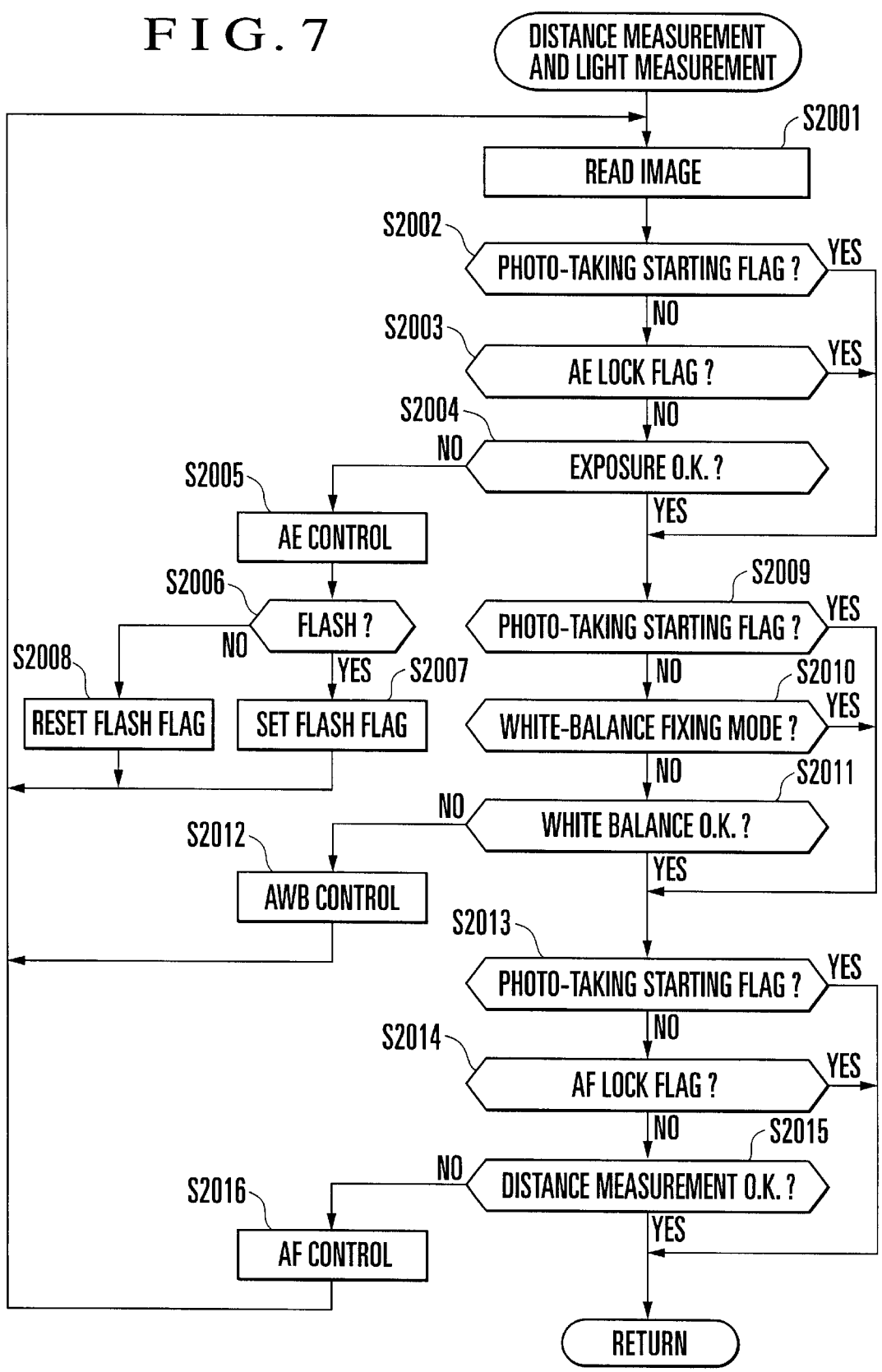
FIG. 7 is a flow chart showing a distance measurement and light measurement processing routine.

FIG. 7 is a flow chart showing the details of the distance measurement and light measurement process in the step S164 shown in FIG. 5.

Referring to FIG. 7, in step S2001, the system control circuit 50 reads out electric charge signals from the image sensor 14 to form photo-taken image data through the A/D converter 16, and causes the image processing circuit 20 to successively read the photo-taken image data. While using the successively-read image data, the image processing circuit 20 performs predetermined computing operations to be used for the AE (automatic exposure) processing operation of the TTL (through-the-lens) type, the EF (preliminary flash emission in electronic flash) processing operation and the AF (automatic focusing) processing operation.

Incidentally, in each of the above processing operations, a particular part of all the pixels subjected to the photo-taking operation are cut and extracted, according to necessity and for a necessary number of portions, to be used for each computing operation. This arrangement makes it possible to perform an optimum computing operation for each of different modes, including a center-weighted mode, an average mode, an evaluation mode and a spot mode, in each of the AE processing operation of the TTL type, the EF processing operation, the AWB processing operation and the AF processing operation.

In step S2002, the system control circuit 50 makes a check for the state of the photo-taking starting flag stored in the internal memory of the system control circuit 50 or the memory 52. If it is found in the step S2002 that the photo-taking starting flag has already been set, the procedure proceeds to step S2009.

As mentioned above, in a case where the photo-taking operation for a series of images for forming a panorama image has been started with the photo-taking starting flag already set, the photo-taking operation for the series of images for forming a panorama image continues at a fixed setting value of exposure without performing a new exposure control operation.

If it is found in the step S2002 that the photo-taking starting flag has already been canceled, the procedure proceeds to step S2003. In the step S2003, the system control circuit 50 makes a check for the state of the AE lock flag stored in the internal memory of the system control circuit 50 or the memory 52. If it is found in the step S2003 that the AE lock flag has already been set, the procedure proceeds to step S2009.

As mentioned above, in a case where the photo-taking operation for a series of images for forming a panorama image has been started with the AE lock flag set by the depression of the AE lock switch included in the operation part 70, the photo-taking operation for the series of images for forming a panorama image continues at a fixed setting value of exposure with an exposure control operation locked.

If it is found in the step S2003 that the AE lock flag has already been canceled, the system control circuit 50 performs the AE control operation by means of the exposure control part 340 in step S2005, until it is found in step S2004 that an exposure value is decided to be appropriate on the basis of a result of the computing operation of the image processing circuit 20.

In step S2006, the system control circuit 50 makes a check to find if flash emission is necessary, on the basis of measured data obtained by the AE control operation. If it is found in the step S2006 that flash emission is necessary, the procedure proceeds to step S2007. In the step S2007, the system control circuit 50 sets the flash flag, and stores the setting of the flash flag in the internal memory of the system control circuit 50 or the memory 52. If it is found in the step S2006 that flash emission is not necessary, the procedure proceeds to step S2008. In the step S2008, the system control circuit 50 cancels the flash flag, and stores the cancellation of the flash flag in the internal memory of the system control circuit 50 or the memory 52.

If it is found in the step S2004 that the exposure (AE) value is decided to be appropriate, the system control circuit 50 stores the measured data and/or setting parameters in the internal memory of the system control circuit 50 or the memory 52. Then, the procedure proceeds to step S2009.

In step S2009, the system control circuit 50 makes a check for the state of the photo-taking starting flag stored in the internal memory of the system control circuit 50 or the memory 52. If it is found in the step S2009 that the photo-taking starting flag has already been set, the procedure proceeds to step S2013.

As mentioned above, in a case where the photo-taking operation for a series of images for forming a panorama image has been started with the photo-taking starting flag already set, the photo-taking operation for the series of images for forming a panorama image continues at a fixed setting value of white balance (WB) without performing a new white balance (WB) control operation.

If it is found in the step S2009 that the photo-taking starting flag has already been canceled, the procedure proceeds to step S2010. In the step S2010, the system control circuit 50 makes a check for the state of the white balance mode stored in the internal memory of the system control circuit 50 or the memory 52. If it is found in the step S2010 that a white balance fixing mode has already been set, the procedure proceeds to step S2013.

Here, the white balance fixing mode includes a sunlight mode, a cloudy-sky mode, an incandescent lamp mode, a fluorescent lamp mode, etc. Incidentally, although the sunlight mode, the cloudy-sky mode, the incandescent lamp mode or the fluorescent lamp mode is taken as an example of the white balance fixing mode, all or any one of these white balance modes may be modified to such a mode that the white balance value is set to a color temperature range which is limited as compared with the white balance automatic mode. In this case, the procedure proceeds to step S2012 through step S2011. In the step S2012, the system control circuit 50 performs the white balance control operation with a predetermined color temperature range and/or with a predetermined color temperature centered on.

As mentioned above, in a case where the photo-taking operation for a series of images for forming a panorama image has been started with the white balance fixing mode already set, the photo-taking operation for the series of images for forming a panorama image continues at a fixed setting value of white balance (WB) without performing a new white balance (WB) control operation.

If it is found in the step S2010 that the white balance automatic mode has already been set, the system control circuit 50 performs an automatic white balance control operation by adjusting color processing parameters by means of the image processing circuit 20 in step S2012, until the white balance value is decided, in step S2011, to be appropriate on the basis of a result of the computing operation of the image processing circuit 20 and the measured data obtained by the AE control operation.

If it is found in the step S2011 that the white balance value is decided to be appropriate, the system control circuit 50 stores the measured data and/or the setting parameters in the internal memory of the system control circuit 50 or the memory 52.

In step S2013, the system control circuit 50 makes a check for the state of the photo-taking starting flag. If it is found in the step S2013 that the photo-taking starting flag has already been canceled, the procedure proceeds to step S2014. In the step S2014, the system control circuit 50 makes a check for the state of the AF lock flag stored in the internal memory of the system control circuit 50 or the memory 52. If it is found in the step S2014 that the AF lock flag has already been set, the distance measurement and light measurement processing routine (step S164) is brought to an end.

As mentioned above, in a case where the photo-taking operation for a series of images for forming a panorama image has been started with the AF lock flag already set by the depression of the AF lock switch included in the operation part 70, the photo-taking operation for the series of images for forming a panorama image continues at a fixed setting position of focus with the AF control operation locked.

If it is found in the step S2014 that the AF lock flag has already been canceled, the system control circuit 50 performs the AF control operation by means of the distance measurement control part 342 in step S2016, until an in-focus state is decided, in step S2015, to have been obtained by the distance measuring operation.

If it is found in the step S2015 that an in-focus state is decided to have been obtained, the system control circuit 50 stores the measured data and/or the setting parameters in the internal memory of the system control circuit 50 or the memory 52. Then, the distance measurement and light measurement processing routine (step S164 in the flow chart of FIG. 5) is brought to an end.

Figure 8:
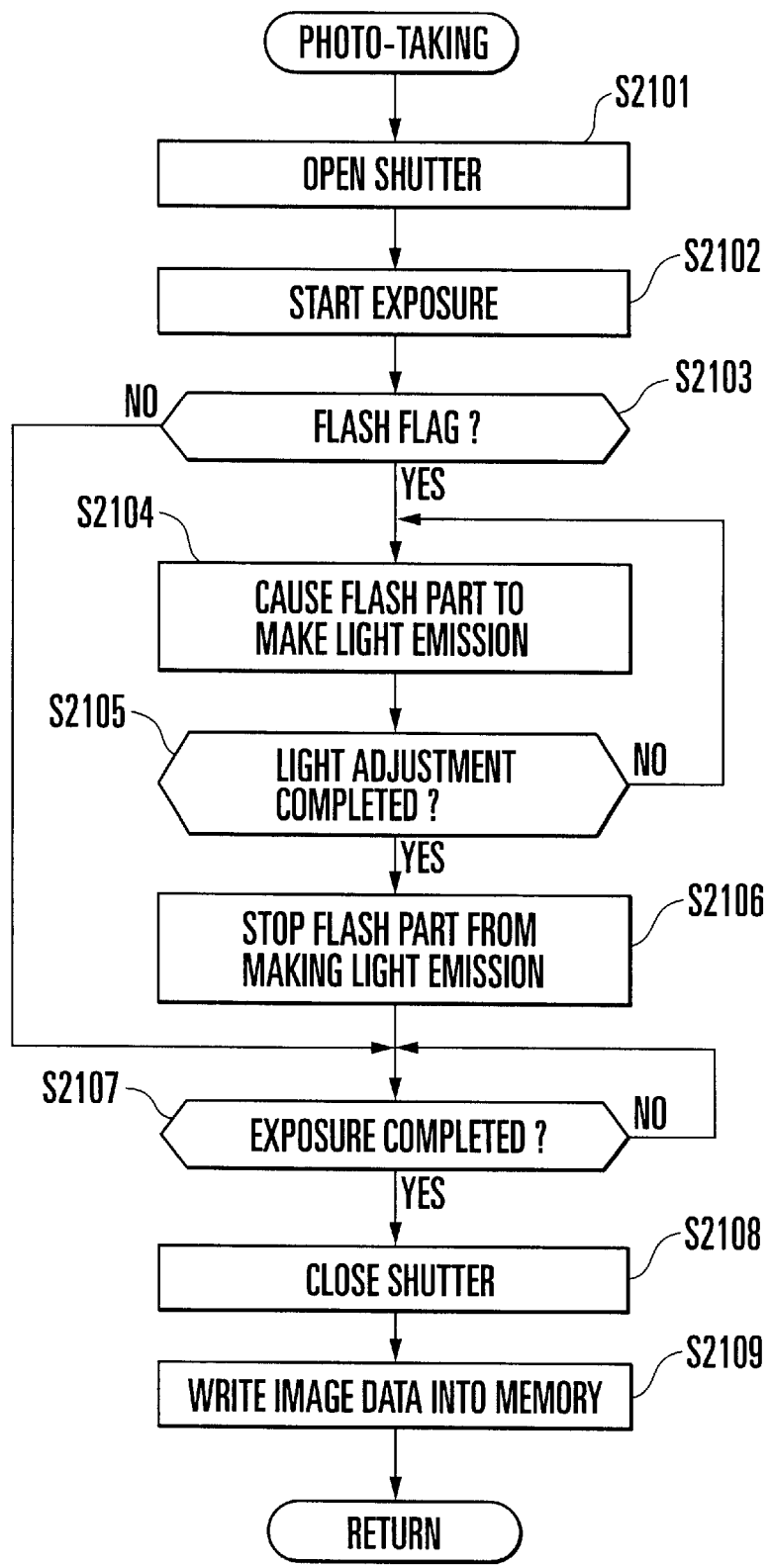
FIG. 8 is a flow chart showing a photo-taking processing routine.

FIG. 8 is a flow chart showing the details of the photo-taking process in the step S184 shown in FIG. 6.

Referring to FIG. 8, in step S2101 and step S2102, the system control circuit 50 causes the image sensor 14 to be exposed to light by opening the shutter 312 and reducing the aperture of the shutter 312 to a predetermined aperture value by means of the exposure control part 340, according to the light measurement data and the shutter speed parameters stored in the internal memory of the system control circuit 50 or the memory 52.

In step S2103, the system control circuit 50 makes a check for the state of the flash flag stored in the internal memory of the system control circuit 50 or the memory 52. If it is found in the step S2103 that the flash flag is not set, the procedure proceeds to step S2107. If it is found in the step S2103 that the flash flag has already been set, the system control circuit 50 causes the flash part 48 to make light emission in step S2104 until the light adjustment operation is completed in step S2105. If the light adjustment operation is completed in step S2105, the system control circuit 50 stops the flash part 48 from making light emission in step S2106.

In step S2107, the system control circuit 50 waits for the completion of the exposure operation on the image sensor 14 according to the light measurement data and the shutter speed parameters. In step S2108, the system control circuit 50 closes the shutter 312. In step S2109, the system control circuit 50 reads out electric charge signals from the image sensor 14 and writes the thus-obtained photo-taken image data into the memory 30 through the A/D converter 16, the image processing circuit 20 and the memory control circuit 22, or through the A/D converter 16 and the memory control circuit 22.

With the above series of operations completed, the photo-taking process routine (step S184 in the flow chart of FIG. 6) is brought to an end.

Figure 9:
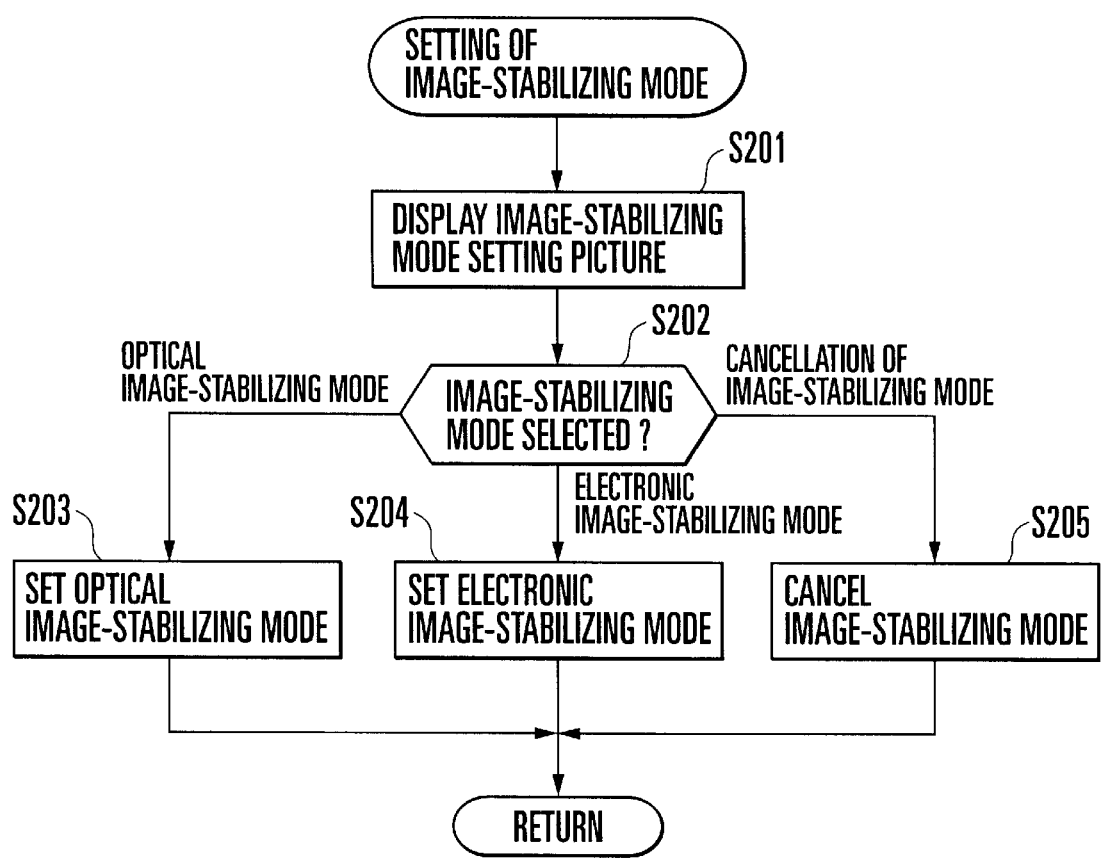
FIG. 9 is a flow chart showing an image-stabilizing mode setting routine.

FIG. 9 is a flow chart showing the details of the image-stabilizing mode setting process in the step S128 shown in FIG. 3 or in the step S170 shown in FIG. 5.

Figure 22A:
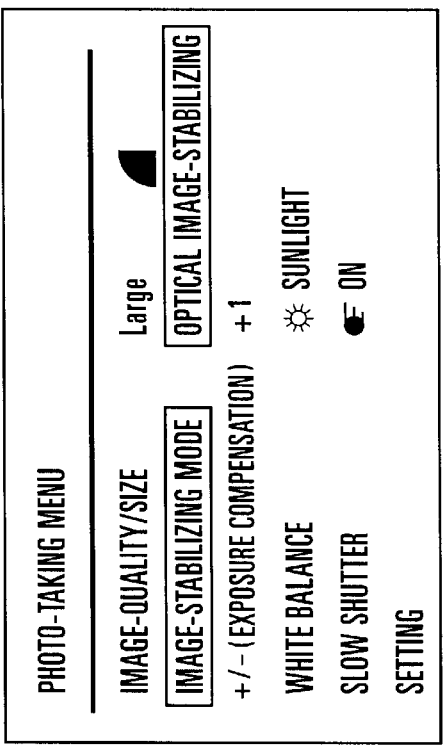
FIGS. 22(a), 22(b) and 22(c) are diagrams for explaining examples of a photo-taking menu picture.

Referring to FIG. 9, in step S201, the system control circuit 50 causes the image display part 28 to display an image-stabilizing mode setting picture. More specifically, when the menu button included in the operation part 70 is depressed, a photo-taking menu picture is displayed on the image display part 28. An example of the photo-taking menu picture is shown in FIG. 22(a). In the example shown in FIG. 22(a), the various submenus, including the image-quality/size, the image-stabilizing mode, the exposure compensation, the white balance, the slow shutter, the setting operation, etc., are displayed in such a manner as to be selectable.

Figure 22B:
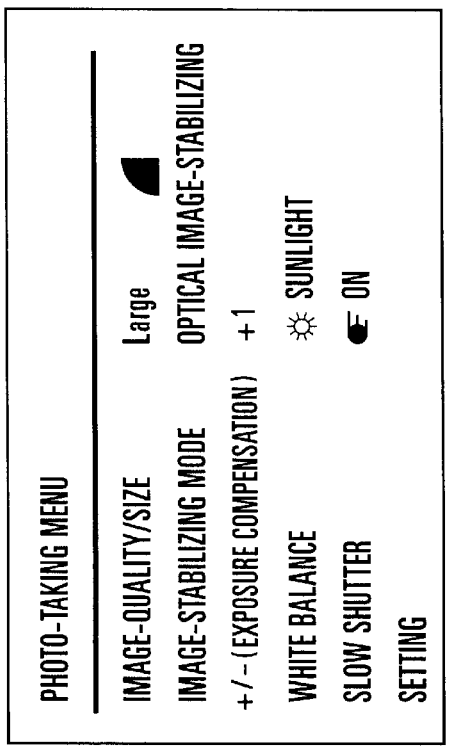

Subsequently, the image-stabilizing mode is selected by the depression of the selection/changeover switch 66, and is then made definite by the depression of the decision/execution switch 68. In response to these operations, the image-stabilizing mode setting picture is displayed. An example of the image-stabilizing mode setting picture is shown in FIG. 22(b). In the example shown in FIG. 22(b), the setting of the optical image-stabilizing mode, the setting of the electronic image-stabilizing mode and the setting of the cancellation of the image-stabilizing mode are displayed in such a manner as to be selectable.

The system control circuit 50 performs the setting operations required for the respective image-stabilizing modes according to the selection of the image-stabilizing mode (step S202), and stores a flag for the set image-stabilizing mode in the internal memory of the system control circuit 50 or the memory 52. More specifically, the image-stabilizing mode is selected by the depression of the selection/changeover switch 66, and is then made definite by the depression of the decision/execution switch 68.

The system control circuit 50, if the optical image-stabilizing mode is selected, executes the setting of the optical image-stabilizing mode (step S203), if the electronic image-stabilizing mode is selected, executes the setting of the electronic image-stabilizing mode (step S204), or, if the cancellation of the image-stabilizing mode is selected, cancels the optical image-stabilizing mode or the electronic image-stabilizing mode (step S205), and then stores a flag for the set image-stabilizing mode in the internal memory of the system control circuit 50 or the memory 52.

With the above series of operations completed, the image-stabilizing mode setting process routine (step S128 shown in the flow chart of FIG. 3 and step S170 in the flow chart of FIG. 5) is brought to an end.

As has been described above, according to the first embodiment, if a photo-taking operation for a series of images for forming a panorama image has already started, a setting operation for the image-stabilizing mode is inhibited and a predetermined warning is issued. Accordingly, it is possible to prevent such a situation that photo-taken images which have been processed differently according to the setting of the image-stabilizing mode are mixed during the process of the photo-taking operation for the series of images for forming a panorama image, i.e., images inadequate for forming a panorama image are combined to be photo-taken.

(Second Embodiment)

Next, an image processing apparatus according to a second embodiment of the invention will be described. The arrangement of the image processing apparatus according to the second embodiment is the same as that described with reference to FIG. 1. In the second embodiment, the operation of the image processing apparatus 100 is different from that of the image processing apparatus according to the first embodiment. FIGS. 17 to 21 are flow charts showing a main routine of the operation of the image processing apparatus 100 according to the second embodiment.

Figure 17:
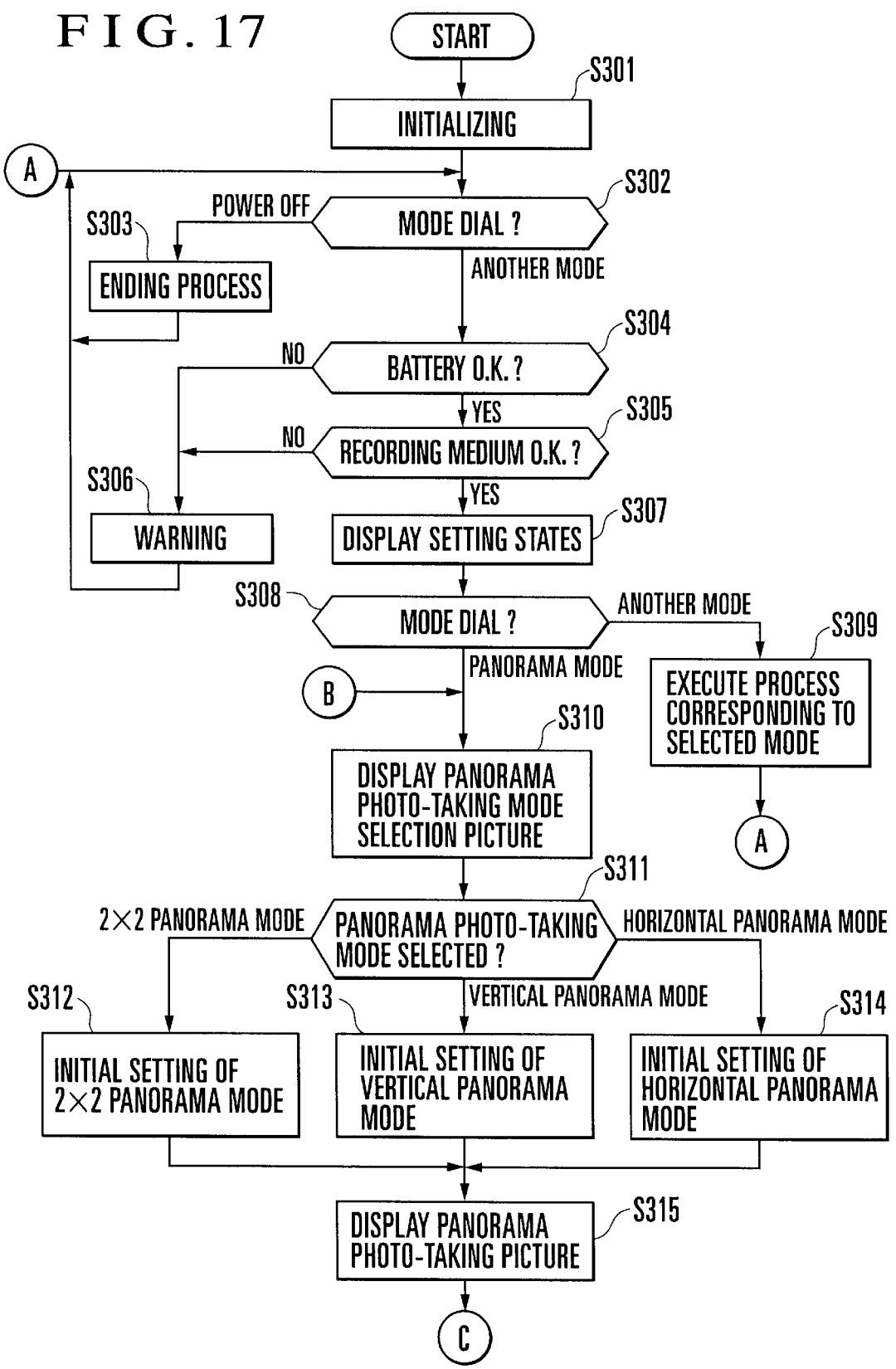
FIG. 17 is a flow chart showing processes in a part of a main routine of the operation of an image processing apparatus, serving as a photo-taking apparatus, according to a second embodiment of the invention.

Referring first to FIG. 17, in step S301, when a power source is loaded into the image processing apparatus 100 due to the exchange of batteries, or the like, the system control circuit 50 initializes flags, control variables, etc., and performs an initializing process on each part of the image processing apparatus 100.

In step S302, the system control circuit 50 makes a check for the setting position of the mode dial 60. If it is found in the step S302 that the mode dial 60 is set to the turning-off of the power source, the procedure proceeds to step S303. In the step S303, the system control circuit 50 performs a predetermined ending process, including the operation of bringing a display of each display part into an end state, closing any protection means, such as a barrier, of the lens unit 300 to protect an image pickup part, recording, in the nonvolatile memory 56, necessary parameters, setting values and setting modes including flags, control variables, etc., causing the power source control part 80 to shut off unnecessary electric power of each part of the image processing apparatus 100, including the image display part 28, etc. Then, the procedure returns to the step S302.

If it is found in the step S302 that the mode dial 60 is set to a mode other than the power-source turning-off mode, the procedure proceeds to step S304. In the step S304, the system control circuit 50 makes a check, through the power source control part 80, to find if the remaining capacity or operating condition of the power source part 86, which is composed of batteries or the like, causes a problem with respect to the operation of the image processing apparatus 100. If it is found in the step S304 that there is a problem in the power source part 86, the procedure proceeds to step S306. In the step S306, the system control circuit 50 causes the display part 54 to make a predetermined warning display with an image or sound. Then, the procedure returns to the step S302. Incidentally, if the image displaying action of the image display part 28 is currently in an on-state, the predetermined warning display is performed also by using the image display part 28 with an image or sound.

If it is found in the step S304 that there is no problem in the power source part 86, the procedure proceeds to step S305. In the step S305, the system control circuit 50 makes a check to find if the operating condition of the recording medium 200 or 210 causes a problem with respect to the operation of the image processing apparatus 100, particularly, a recording or reproducing operation for image data on the recording medium 200 or 210. If it is found in the step S305 that there is a problem in the operating condition of the recording medium 200 or 210, the procedure proceeds to step S306. In the step S306, the system control circuit 50 causes the display part 54 to make a predetermined warning display with an image or sound. Then, the procedure returns to the step S302. Incidentally, if the image displaying action of the image display part 28 is currently in an on-state, the predetermined warning display is performed also by using the image display part 28 with an image or sound.

If it is found in the step S305 that there is no problem in the operating condition of the recording medium 200 or 210, the procedure proceeds to step S307. In the step S307, the system control circuit 50 causes the display part 54 to display the various setting states of the image processing apparatus 100 with an image or sound. Incidentally, if the image displaying action of the image display part 28 is currently in an on-state, the display of the various setting states of the image processing apparatus 100 is performed also by using the image display part 28 with an image or sound.

In the next step S308, the system control circuit 50 makes a check again for the setting position of the mode dial 60. If it is found in the step S308 that the mode dial 60 is set to a mode other than a panorama mode, the procedure proceeds to step S309. In the step S309, the system control circuit 50 executes a process corresponding to the selected mode. After the completion of the process, the procedure returns to the step S302.

If it is found in the step S308 that the mode dial 60 is set to the panorama mode, the procedure proceeds to step S310. In the step S310, the system control circuit 50 causes the image display part 28 to display a panorama photo-taking mode selection picture. Then, the user of the image processing apparatus 100 is enabled to select a desired mode from among a plurality of panorama photo-taking modes while viewing the panorama photo-taking mode selection picture displayed at the image display part 28.

The plurality of panorama photo-taking modes include a 2×2 panorama mode, a horizontal panorama mode and a vertical horizontal mode, in which a plurality of photo-taken images are combined so as to form a panorama image enlarged two-dimensionally, a panorama image enlarged horizontally and a panorama image enlarged vertically, respectively. Since each of a series of photo-taken images has, added thereto, information indicative of the positional relation thereof, it is possible for the image processing apparatus 100 itself or a computer or the like, to which the images are transferred, to form one panorama image by combining the series of photo-taken images. Incidentally, an example of the panorama photo-taking mode selection picture is the same as that shown in FIG. 10.

In step S311, the system control circuit 50 makes a check to find which has been selected, by the operation of the selection/changeover switch 66 and that of the decision/execution switch 68, from among the 2×2 panorama mode, the vertical panorama mode and the horizontal panorama mode. If it is found in the step S311 that the 2×2 panorama mode, the vertical panorama mode or the horizontal panorama mode has been selected, the procedure proceeds to step S312, step S313 or step S314, respectively. In the step S312, step S313 or step S314, the system control circuit 50 performs the initial setting of the 2×2 panorama mode, the initial setting of the vertical panorama mode or the initial setting of the horizontal panorama mode, respectively, in such a way as to set flags, parameters, initial values of variables and memory areas and to read out a display picture serving as a user interface. Then, the procedure proceeds to step S315. In the step S315, the system control circuit 50 causes the image display part 28 to display a panorama photo-taking picture corresponding to the selected panorama photo-taking mode. Then, the procedure proceeds to step S321 in the flow chart of FIG. 18.

An example of the horizontal panorama mode photo-taking picture is shown in FIGS. 11(*a*) and 11(*b*), an example of the vertical panorama mode photo-taking picture is shown in FIGS. 12(*a*) and 12(*b*), and an example of the 2×2 panorama mode photo-taking picture is shown in FIGS. 13(*a*) and 13(*b*). The details of each of these panorama mode photo-taking pictures are the same as those described in the first embodiment.

Figure 18:
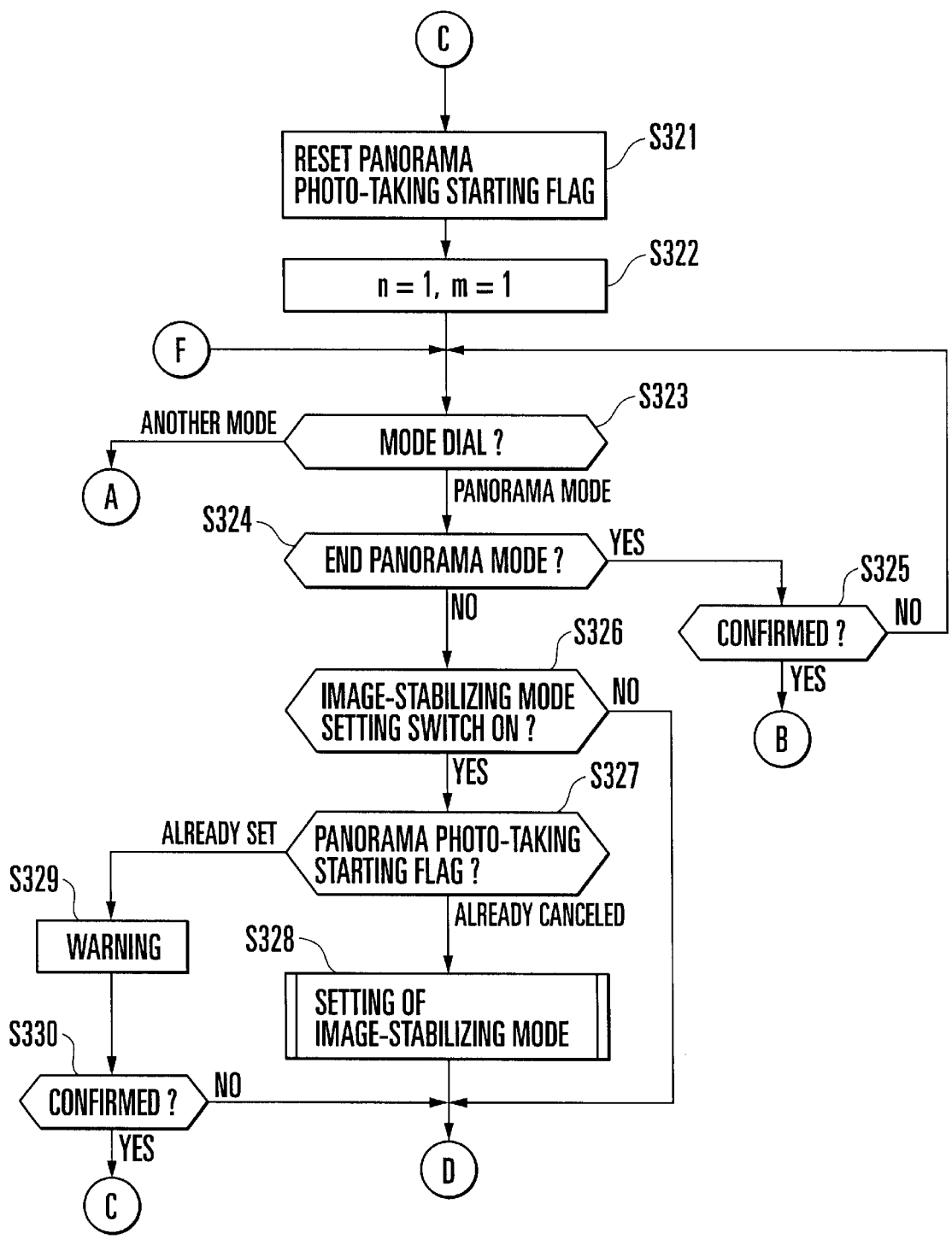
FIG. 18 is a flow chart showing processes in a part of the main routine of the operation of the image processing apparatus according to the second embodiment.

Referring to the flow chart of FIG. 18, the system control circuit 50 initializes flags and variables which have been set in an internal memory of the system control circuit 50 or the memory 52. For example, in step S321, the system control circuit 50 cancels a panorama photo-taking starting flag, and in step S322, the system control circuit 50 sets variables "m" and "n" and initializes the variables "m" and "n" to "m=1" and "n=1", respectively.

Here, the cancellation of the panorama photo-taking starting flag indicates that no images of a series of images for forming a panorama image have been photo-taken as yet. Further, the variable "n" indicates the order number of a photo-taking area in each panorama photo-taking mode. The variable "m" is used for returning a photo-taking area to the just-preceding area or canceling such returning, in re-performing a photo-taking operation in the horizontal panorama mode or the vertical panorama mode. The details of a method for using theses flags and variables are the same as those described in the foregoing.

In step S323, the system control circuit 50 makes a check for the setting position of the mode dial 60. If it is found in the step S323 that the mode dial 60 is set to a mode other than the panorama mode, the system control circuit 50 cancels effect flags which have been stored in the internal memory of the system control circuit 50 or the memory 52, and ends the photo-taking operation for the panorama mode. Then, the procedure returns to the step S302 in the flow chart of FIG. 17. This arrangement enables the user of the image processing apparatus 100 to end the panorama mode at any time so as to change the mode of the image processing apparatus 100 to another mode.

If it is found in the step S323 that the mode dial 60 is set to the panorama mode, the procedure proceeds to step S324. In the step S324, the system control circuit 50 makes a check to find if the end of the panorama mode has been selected by the depression of the decision/execution switch 68 (for example, the [SET] key) in the state where any one of the above-mentioned panorama photo-taking pictures is displayed on the image display part 28. If it is found in the step S324 that the end of the panorama mode has been selected, the procedure proceeds to step S325. In the step S325, the system control circuit 50 causes the image display part 28 to make a display for the confirmation of the end of the panorama mode, and makes a check to find if the confirmation of the end of the panorama mode has been selected. If it is found in the step S325 that the confirmation of the end of the panorama mode has been selected, the procedure returns to the step S310 in the flow chart of FIG. 17, where the panorama photo-taking mode selection picture is displayed.

If it is found in the step S324 that the end of the panorama mode is not selected, the procedure proceeds to step S326. In the step S326, the system control circuit 50 makes a check to find if the image-stabilizing mode setting switch 78 has been turned on. If it is found in the step S326 that the image-stabilizing mode setting switch 78 has not been turned on, the procedure proceeds to step S341 in the flow chart of FIG. 19.

If it is found in the step S326 that the image-stabilizing mode setting switch 78 has been turned on, the procedure proceeds to step S327. In the step S327, the system control circuit 50 makes a check for the state of the panorama photo-taking starting flag which has been stored in the internal memory of the system control circuit 50 or the memory 52.

If it is found in the step S327 that the panorama photo-taking starting flag has already been canceled, i.e., a photo-taking operation for the first image of a series of images for forming a panorama image is not yet performed, the procedure proceeds to step S328. In the step S328, the system control circuit 50 performs an image-stabilizing mode setting process for setting, in response to the input of the image-stabilizing mode setting switch 78, flags and parameters related to the image-stabilizing function as inputted and for storing the flags and parameters in the internal memory of the system control circuit 50 or the memory 52. The details of the image-stabilizing mode setting process (step S328) are the same as those described in the foregoing with reference to FIG. 9. When the image-stabilizing mode setting process (step S328) has been finished, the procedure proceeds to step S341 in the flow chart of FIG. 19.

If it is found in the step S327 that the panorama photo-taking starting flag has already been set, i.e., a photo-taking operation for the first image of a series of images for forming a panorama image has already been performed, the procedure proceeds to step S329. In the step S329, the system control circuit 50 causes the display part 54 and/or the image display part 28 to make a predetermined warning display with an image or sound. In the next step S330, the system control circuit 50 makes a check to find if the confirmation of the end of a photo-taking operation for a series of images for forming a panorama image has been selected. If it is found in the step S330 that the confirmation of the end of the photo-taking operation for a series of images for forming a panorama image has been selected, the photo-taking operation performed up to now for a series of images for forming a panorama image is once stopped, and the procedure returns to the step S321, where a new photo-taking operation for a series of images for forming a panorama image is started. If it is found in the step S330 that the cancellation of the end of the photo-taking operation for a series of images for forming a panorama image is selected, the procedure proceeds to step S341 in the flow chart of FIG. 19 without performing the image-stabilizing mode setting process (step S328).

This arrangement makes it possible to prevent such a situation that the setting of the image-stabilizing mode setting switch 78 is performed in the process of photo-taking operations for a series of images for forming a panorama image and, as a result, photo-taken images which have been processed differently according to the setting/non-setting of the image-stabilizing mode and/or according to the difference in image-stabilizing mode between the optical image-stabilizing mode and the electronic image-stabilizing mode are mixed, i.e., images inadequate for forming a panorama image are combined to be photo-taken.

Figure 22C:
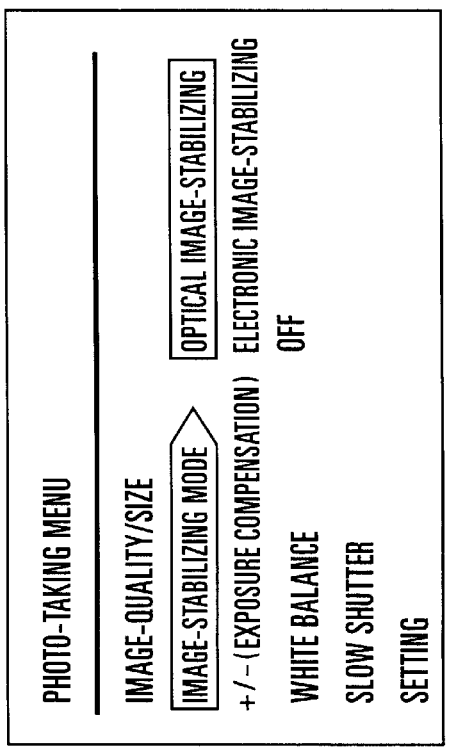

Incidentally, as an example of the predetermined warning display in the step S329, such a display as to indicate that the setting of each image-stabilizing mode is impossible may be made on the image-stabilizing mode setting picture. For example, as shown in FIG. 22(c), in a photo-taking menu picture, an item for the setting of the image-stabilizing mode may be displayed in a gray-out manner (surrounded by a line in the case of FIG. 22(c)), thereby making the selection of the image-stabilizing mode impossible, or the item itself for the setting of the image-stabilizing mode may be non-displayed. These are only examples, so that the warning display may be performed in the various other manners.

Figure 19:
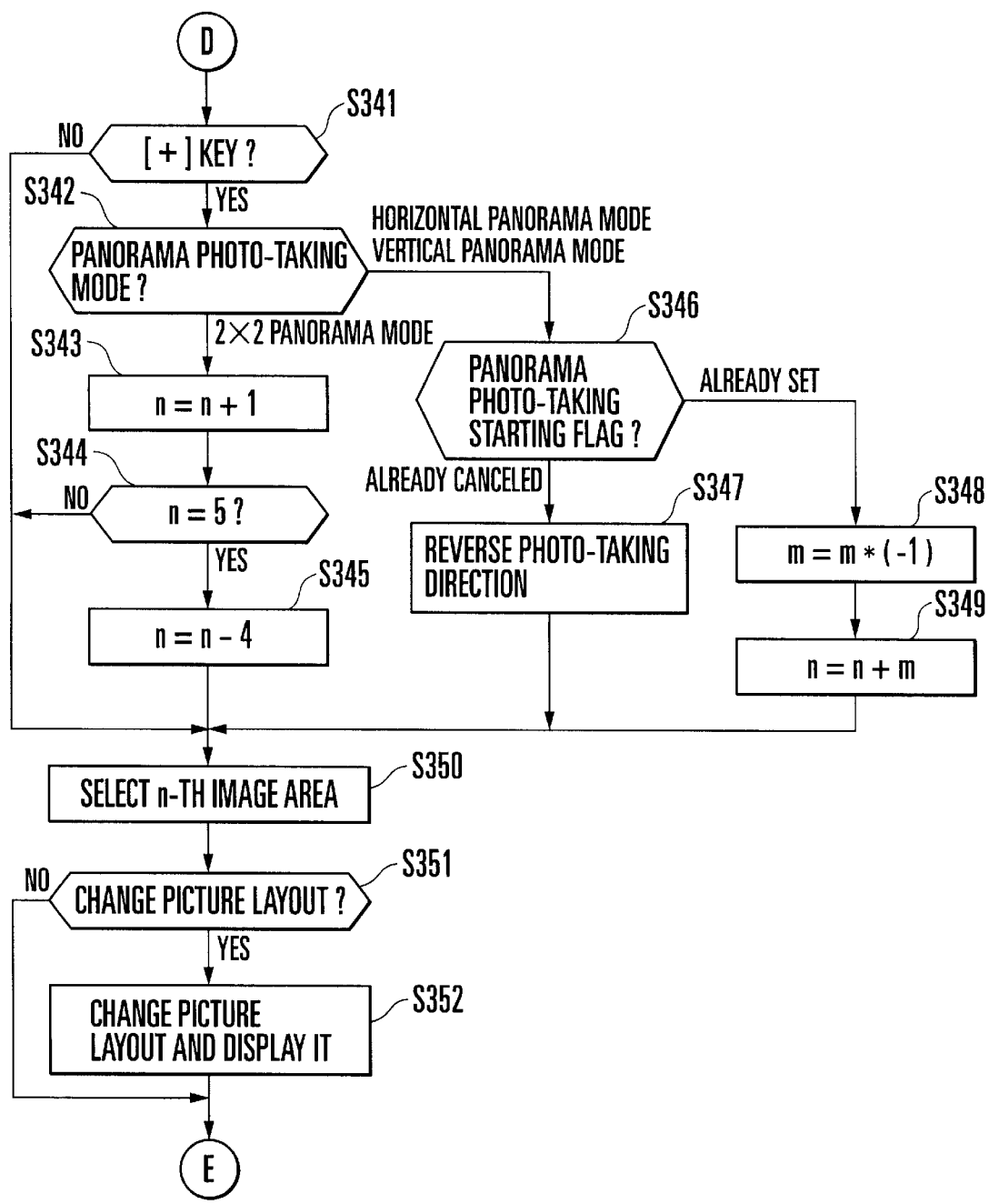
FIG. 19 is a flow chart showing processes in a part of the main routine of the operation of the image processing apparatus according to the second embodiment.

Referring to the flow chart of FIG. 19, in step S341, the system control circuit 50 makes a check to find if the selection/changeover switch 66 (for example, the [+] key) has been depressed in the state where any one of the above-mentioned panorama photo-taking pictures is displayed on the image display part 28. If it is found in the step S341 that the selection/changeover switch 66 has been depressed, the system control circuit 50 performs a predetermined process according to the setting of the panorama photo-taking mode in step S342 and subsequent steps. If it is found in the step S341 that the selection/changeover switch 66 has not been depressed, the procedure proceeds to step S350.

Specifically, in step S342, the system control circuit 50 makes a check to find if the panorama photo-taking mode is the 2×2 panorama mode or the horizontal panorama mode or the vertical panorama mode. If it is found in the step S342 that the panorama photo-taking mode is the 2×2 panorama mode, the procedure proceeds to step S343. In the step S343, the system control circuit 50 changes the variable "n" to "n=n+1" to shift the photo-taking area to the next area. In the next step S344, the system control circuit 50 makes a check to find if the variable "n" is equal to "5". If it is found in the step S344 that the variable "n" is equal to "5", the procedure proceeds to step S345. In the step S345, the system control circuit 50 changes the variable "n" to "n =n−4" to return the photo-taking area to the first area. After that, the procedure proceeds to step S350. In other words, every time the selection/changeover switch 66 (for example, the [+] key) has been depressed, the photo-taking area repeatedly shifts among four areas of the panorama photo-taking picture for the 2×2 panorama mode. For example, the photo-taking area shifts sequentially to the upper right, the lower right, the lower left, the upper left, the upper right, the lower right, . . . , of the panorama photo-taking picture.

On the other hand, if it is found in the step S342 that the panorama photo-taking mode is the horizontal panorama mode or the vertical panorama mode, the procedure proceeds to step S346. In the step S346, the system control circuit 50 makes a check for the state of the panorama photo-taking starting flag. If it is found in the step S346 that the panorama photo-taking starting flag has already been canceled, i.e., a photo-taking operation for the first image of a series of images for forming a panorama image is not yet performed, the procedure proceeds to step S347. In the step S347, the system control circuit 50 reverses the photo-taking direction adopted in the panorama photo-taking mode. After that, the procedure proceeds to step S350.

Incidentally, the reversing operation of the photo-taking direction can be repeatedly performed until a photo-taking operation for the first image is performed. Here, examples of the photo-taking directions on the panorama photo-taking picture in the horizontal panorama mode are shown in FIGS.

11(*a*) and 11(*b*). In the case of the panorama photo-taking picture shown in FIG. 11(*a*), a photo-taking operation is repeated toward the right, and in the case of the panorama photo-taking picture shown in FIG. 11(*b*), a photo-taking operation is repeated toward the left. Further, examples of the photo-taking directions on the panorama photo-taking picture in the vertical panorama mode are shown in FIGS. 12(*a*) and 12(*b*). In the case of the panorama photo-taking picture shown in FIG. 12(*a*), a photo-taking operation is repeated upward, and in the case of the panorama photo-taking picture shown in FIG. 12(*b*), a photo-taking operation is repeated downward.

Next, if it is found in the step S342 that the panorama photo-taking mode is the horizontal panorama mode or the vertical panorama mode and it is found in the step S346 that the panorama photo-taking starting flag has already been set, i.e., a photo-taking operation for the first image of a series of images for forming a panorama image has already been performed, the procedure proceeds to step S348. In the step S348, the system control circuit 50 performs a computing operation of "m=m*(−1)", i.e., such a computing operation as to reverse the sign, as −1, +1, −1, +1, . . . , for every operation. Then, in the step S349, the system control circuit 50 changes the variable "n" to "n=n+m", i.e., performs such a computing operation as to obtain "n=n−1", "n=n+1", "n=n−1", "n=n+1", . . . , for every operation. After that, the procedure proceeds to step S350.

This arrangement makes it possible to repeatedly select one of the operation of shifting the photo-taking area to an area already subjected to a photo-taking operation, although being the last photo-taking operation only, for re-performing the photo-taking operation and the operation of canceling the operation of shifting the photo-taking area to the area already subjected to the photo-taking operation. Accordingly, the user of the image processing apparatus is enabled to perform the following operation. After a photo-taking operation on the n-th photo-taking area for forming a panorama image, the user depresses the selection/changeover switch 66 (for example, the [+] key) to confirm a condition of joining of boundary zones between a quick-review image on the (n−1)th photo-taking area and a quick-review image on. the n-th photo-taking area. Then, after temporarily releasing the selection/changeover switch 66 (for example, the [+] key) to bring a display on the n-th photo-taking area into a through image, the user again depresses the selection/changeover switch 66 (for example, the [+] key) to cause the original quick-review image on the n-th photo-taking area and a through image on the (n+1)th photo-taking image to be displayed for the purpose of proceeding to the next photo-taking operation.

In addition, in a case where, when, after a photo-taking operation on the n-th photo-taking area for forming a panorama image, the user depresses the selection/changeover switch 66 (for example, the [+] key) to confirm a condition of joining of boundary zones between a quick-review image on the (n−1)th photo-taking area and a quick-review image on the n-th photo-taking area, the user decides to re-perform the photo-taking operation on the n-th photo-taking area, the user releases the selection/changeover switch 66 (for example, the [+] key) to bring a display on the n-th photo-taking area into a through image, and, then, depresses the shutter switch 64 (SW2) while keeping the through image on the n-th photo-taking area, so that the original photo-taken image on the n-th photo-taking area is replaced with a new photo-taken image. Then, the user is enabled to perform the next photo-taking operation for forming a panorama image.

In the step S350, the system control circuit 50 selects the n-th photo-taking area. Then, in step S351, the system control circuit 50 makes a check to find if it is necessary to change a picture layout according to the selected photo-taking area. If it is found in the step S351 that it is necessary to change the picture layout, the procedure proceeds to step S352. In the step S352, the system control circuit 50 causes the image display part 28 to change the picture layout and display the changed picture layout. After that, the procedure proceeds to step S361 in the flow chart of FIG. 20.

This arrangement makes it possible to display, according to necessity, a picture associated with the reversing operation of the photo-taking direction, as mentioned above, a picture associated with the change of the photo-taking area, a picture in which characters or images for explanation are renewed, or the like. Further, since, in the second or subsequent photo-taking operation, the photo-taking area already subjected to the photo-taking operation is set to a quick-review display state and the current photo-taking area shifted for the next photo-taking operation is set to a through display state, it becomes possible to display a reproduced image of the already-photo-taken image and an image to be next photo-taken, in a partially overlapping manner. This arrangement enables the user of the image processing apparatus 100 to readily decide the next photo-taking composition.

Referring to the flow chart of FIG. 20, in step S361, the system control circuit 50 brings the image display part 28 into a through display state in which photo-taken image data is successively displayed. Then, the procedure proceeds to step S362. In the through display state, image data, which has been successively written into the image display memory 24 through the image sensor 14, the A/D converter 16, the image processing circuit 20 and the memory control circuit 22, is successively displayed on the above-mentioned photo-taking area of the image display part 28 through the memory control circuit 22 and the D/A converter 26, thereby realizing the electronic viewfinder function.

In the step S362, the system control circuit 50 makes a check to find if the shutter switch 62 (SW1) is turned on. If it is found in the step S362 that the shutter switch 62 (SW1) is not turned on, the procedure returns to step S323 in the flow chart of FIG. 18. If it is found in the step S362 that the shutter switch 62 (SW1) is turned on, the procedure proceeds to step S373.

In the step S373, the system control circuit 50 makes a check for the state of an image-stabilizing mode flag stored in the internal memory of the system control circuit 50 or the memory 52. If it is found in the step S373 that the image-stabilizing mode flag has already been canceled, the procedure proceeds to step S363.

If it is found in the step S373 that an optical image-stabilizing flag has already been set, the procedure proceeds to step S374. In the step S374, the system control circuit 50 causes the optical image-stabilizing control part 348 to start an optical image-stabilizing process. Then, the procedure proceeds to step S363. If it is found in the step S373 that an electronic image-stabilizing flag has already been set, the procedure proceeds to step S375. In the step S375, the system control circuit 50 causes the memory control circuit 22 having the electronic image-stabilizing function to start an electronic image-stabilizing process. Then, the procedure proceeds to step S363.

In the step S363, the system control circuit 50 sets the display state of the image display part 28 to a frozen display state. Then, the procedure proceeds to step S364.

In the frozen display state, image data, which has been written into the image display memory 24 through the image sensor 14, the A/D converter 16, the image processing circuit 20 and the memory control circuit 22, is inhibited from being rewritten, and the last written image data is displayed on the above-mentioned photo-taking area of the image display part 28 through the memory control circuit 22 and the D/A converter 26, so that a frozen video image is displayed to be used for the electronic viewfinder function.

In step S364, the system control circuit 50 performs a distance measurement process to adjust the focus of the photo-taking lens 310 to an object, performs a light measurement process to decide an aperture value and a shutter speed, and performs a white balance process to adjust color temperature. Incidentally, in the light measurement process, if necessary, the setting of flash light emission is performed.

Further, in the step S364 for the distance measurement and light measurement process, the system control circuit 50 judges whether to execute the AE control operation and/or the AWB control operation and/or the AF control operation, according to the state of a photo-taking starting flag and/or an AE lock flag and/or a white balance mode setting flag and/or an AF lock flag stored in the internal memory of the system control circuit 50 or the memory 52, and performs the various processing operations according to the results of judgment. The details of the step S364 for the distance measurement and light measurement process are the same as those described in the foregoing with reference to FIG. 7.

After the completion of the step S364 for the distance measurement and light measurement process, in step S365, the system control circuit 50 makes a check for the state of a flash flag stored in the internal memory of the system control circuit 50 or the memory 52. If it is found in the step S365 that the flash flag has already been set, the procedure proceeds to step S366. In the step S366, the system control circuit 50 performs a charging operation of the flash part 48. Then, the procedure proceeds to step S367. If it is found in the step S365 that the flash flag has already been canceled, the procedure proceeds to step S367.

In the step 3367, the system control circuit 50 sets the display state of the image display part 28 to the through display state. Then, the procedure proceeds to step S368. Incidentally, the through display state set in the step S367 is the same operating state as the through display state set in the step S361.

In the step S368, the system control circuit 50 makes a check to find if the image-stabilizing mode setting switch 78 has been turned on. If it is found in the step S368 that the image-stabilizing mode setting switch 78 has not been turned on, the procedure proceeds to step S376. If it is found in the step S368 that the image-stabilizing mode setting switch 78 has been turned on, the procedure proceeds to step S369. In the step S369, the system control circuit 50 makes a check for the state of the panorama photo-taking starting flag which has been stored in the internal memory of the system control circuit 50 or the memory 52.

If it is found in the step S369 that the panorama photo-taking starting flag has already been canceled, i.e., a photo-taking operation for the first image of a series of images for forming a panorama image is not yet performed, the procedure proceeds to step S370. In the step S370, the system control circuit 50 performs an image-stabilizing mode setting process for setting, in response to the input of the image-stabilizing mode setting switch 78, flags and parameters related to the image-stabilizing function as inputted and for storing the flags and parameters in the internal memory of the system control circuit 50 or the memory 52. The details of the image-stabilizing mode setting process (step S370) are the same as those described in the foregoing with reference to FIG. 9.

When the image-stabilizing mode setting process (step S370) has been finished, the procedure proceeds to step S376.

If it is found in the step S369 that the panorama photo-taking starting flag has already been set, i.e., a photo-taking operation for the first image of a series of images for forming a panorama image has already been performed, the procedure proceeds to step S371. In the step S371, the system control circuit 50 causes the display part 54 and/or the image display part 28 to make a predetermined warning display with an image or sound. In the next step S372, the system control circuit 50 makes a check to find if the confirmation of the end of a photo-taking operation for a series of images for forming a panorama image has been selected. If it is found in the step S372 that the confirmation of the end of the photo-taking operation for a series of images for forming a panorama image has been selected, the photo-taking operation performed up to now for a series of images for forming a panorama image is once stopped, and the procedure returns to the step S321 shown in FIG. 18, where a new photo-taking operation for a series of images for forming a panorama image is started. If it is found in the step S372 that the cancellation of the end of the photo-taking operation for a series of images for forming a panorama image is selected, the procedure proceeds to step S376.

This arrangement makes it possible to prevent such a situation that the setting of the image-stabilizing mode setting switch 78 is performed in the process of photo-taking operations for a series of images for forming a panorama image and, as a result, photo-taken images which have been processed differently according to the setting/non-setting of the image-stabilizing mode and/or according to the difference in image-stabilizing mode between the optical image-stabilizing mode and the electronic image-stabilizing mode are mixed, i.e., images inadequate for forming a panorama image are combined to be photo-taken.

In the step S376, the system control circuit 50 makes a check for the state of the image-stabilizing mode flag stored in the internal memory of the system control circuit 50 or the memory 52. If it is found in the step S376 that the image-stabilizing mode flag has already been canceled, the procedure proceeds to step S381 in the flow chart of FIG. 21.

If it is found in the step S376 that the optical image-stabilizing flag has already been set, the procedure proceeds to step S377. In the step S377, the system control circuit 50 causes the optical image-stabilizing control part 348 to start the optical image-stabilizing process. Then, the procedure proceeds to step S381 in the flow chart of FIG. 21. If it is found in the step S376 that the electronic image-stabilizing flag has already been set, the procedure proceeds to step S378. In the step S378, the system control circuit 50 causes the memory control circuit 22 having the electronic image-stabilizing function to start the electronic image-stabilizing process. Then, the procedure proceeds to step S381 in the flow chart of FIG. 21.

Referring to the flow chart of FIG. 21, in the step S381, the system control circuit 50 makes a check to find if the shutter switch 64 (SW2) has been turned on. If it is found in the step S381 that the shutter switch 64 (SW2) has not been turned on, the procedure proceeds to step S382. In the step S382, the system control circuit 50 makes a check to find if the shutter switch 62 (SW1) has been turned off. If it is found in the step S382 that the shutter switch 62 (SW1) has been turned off, the procedure proceeds to step S393.

In the step S393, the system control circuit 50 makes a check for the state of the image-stabilizing mode flag stored in the internal memory of the system control circuit 50 or the memory 52. If it is found in the step S393 that the image-stabilizing mode flag has already been canceled, the procedure returns to step S323 in the flow chart of FIG. 18.

If it is found in the step S393 that the optical image-stabilizing flag has already been set, the procedure proceeds to step S394. In the step S394, the system control circuit 50 causes the optical image-stabilizing control part 348 to stop the optical image-stabilizing process. Then, the procedure returns to step S323 in the flow chart of FIG. 18. If it is found in the step S393 that the electronic image-stabilizing flag has already been set, the procedure proceeds to step S395. In the step S395, the system control circuit 50 causes the memory control circuit 22 having the electronic image-stabilizing function to stop the electronic image-stabilizing process. Then, the procedure returns to step S323 in the flow chart of FIG. 18.

If it is found in the step S381 that the shutter switch 64 (SW2) has been turned on, the procedure proceeds to step S383. In the step S383, the system control circuit 50 sets the display state of the image display part 28 to a fixed-color display state. Then, the procedure proceeds to step S384. In the fixed-color display state, instead of the photo-taken image data written into the image display memory 24 through the image sensor 14, the A/D converter 16, the image processing circuit 20 and the memory control circuit 22, image data of a fixed color is displayed on the above-mentioned photo-taking area of the image display part 28 through the memory control circuit 22 and the D/A converter 26, so that a video image of the fixed color is displayed to be used for the electronic viewfinder function.

In the step S384, the system control circuit 50 performs a photo-taking process composed of an exposure process in which photo-taken image data is written into the memory 30 through the image sensor 14, the A/D converter 16, the image processing circuit 20 and the memory control circuit 22 or through the image sensor 14, the A/D converter 16 and the memory control circuit 22, and a developing process in which the image data written in the memory 30 is read out to be subjected to the various processing operations using the memory control circuit 22 and, according to necessity, the image processing circuit 20. The details of the photo-taking process are the same as those described in the foregoing with reference to FIG. 8.

In step S385, the system control circuit 50 reads out the image data written in the memory 30 in the step S384 for the photo-taking process, and, after performing a vertical adding process or a color process on the image data according to necessity, transfers a display image corresponding to the image data to the image display memory 24 through the memory control circuit 22.

In step S386, the system control circuit 50 sets the display state of the image display part 28 to a quick-review display state. Then, the procedure proceeds to step S387. In the quick-review display state, the image data transferred to the image display memory 24 in the step S385 for the display image process is displayed on the above-mentioned photo-taking area of the image display part 28 through the memory control circuit 22 and the D/A converter 26, thereby realizing the electronic viewfinder function for automatically reproducing a photo-taken image.

In step S387, the system control circuit 50 reads out photo-taken image data written in the memory 30 and performs the various image processing operations by means of the memory control circuit 22 and, according to necessity, the image processing circuit 20, and, further, performs a pixel squaring process according to necessity and performs an image compressing process by means of the compression/expansion circuit 32 according to the set mode. In the next step S388, the system control circuit 50 executes a recording process for writing image data into the recording medium 200 or 210, such as a memory card or compact flash card, through the interface 90 or 94 and the connector 92 or 96. In this instance, in a case where the image display part 28 is in an on-state, during a period for which a writing operation into the recording medium 200 or 210 is being performed, an indication indicating that the writing operation is in process, such as an indication of "BUSY", is displayed on the image display part 28. In addition, at the display part 54, an indication indicative of the process of the writing operation into the recording medium 200 or 210, such as a blinking indication by an LED, is also performed.

The system control circuit 50 continues to cause the image display part 28 to perform the quick-review display, until it is found in step S389 that the shutter switch 64 (SW2) is released from the depression thereof. This arrangement enables the user to carefully confirm a photo-taken image while continuing depressing the shutter switch 64 (SW2).

If it is found in step S389 that the shutter switch 64 (SW2) is released from the depression thereof, the procedure proceeds to step S390. In the step S390, the system control circuit 50 sets the panorama photo-taking starting flag, thereby making it clear that a photo-taking operation for the first image in a series of images for forming a panorama image has already been performed.

This arrangement makes it possible to inhibit the photo-taking direction from being reversed after the photo-taking operation for the first image in the horizontal panorama mode or the vertical panorama mode has been performed, as mentioned in the step S346.

Further, that arrangement makes it possible to inhibit the setting of the image-stabilizing mode from being changed after the photo-taking operation for the first image in a series of images for forming a panorama image has been performed, as mentioned in the step S327.

In step S391, the system control circuit 50 changes the variable "n" to "n=n+1" so as to shift the photo-taking area to the next area. In step S392, the system control circuit 50 initializes the variable "m" to "m=1". Then, the procedure proceeds to step S396.

In the step S396, the system control circuit 50 makes a check for the state of the image-stabilizing mode flag stored in the internal memory of the system control circuit 50 or the memory 52. If it is found in the step S396 that the image-stabilizing mode flag has already been canceled, the procedure returns to step S323 in the flow chart of FIG. 18. Then, the system control circuit 50 repeats a series of photo-taking processes for forming a panorama image.

If it is found in the step S396 that the optical image-stabilizing flag has already been set, the procedure proceeds to step S397. In the step S397, the system control circuit 50 causes the optical image-stabilizing control part 348 to stop the optical image-stabilizing process. Then, the procedure returns to step S323 in the flow chart of FIG. 18, thereafter, repeating a series of photo-taking processes for forming a panorama image. If it is found in the step S396 that the electronic image-stabilizing flag has already been set, the procedure proceeds to step S398. In the step S398, the system control circuit 50 causes the memory control circuit 22 having the electronic image-stabilizing function to stop the electronic image-stabilizing process. Then, the procedure returns to step S323 in the flow chart of FIG. 18, thereafter, repeating a series of photo-taking processes for forming a panorama image.

As mentioned above, after the procedure returns to the step S323 as a result of the release from the depression of the shutter switch 64 (SW2), the system control circuit 50 shifts the photo-taking area to the next area in the step S350, and sets the photo-taking areas subjected to the photo-taking operations, including the just-preceding photo-taking operation, to the quick-review display state, and the next photo-taking area to the through display state in the step S352, in such a manner that a photo-taken image and an image to be next photographed overlap each other in part. Accordingly, it is possible for the user to easily perform a joining photo-taking operation for a panorama image.

Here, photo-taking pictures obtained before and after a photo-taking operation for the n-th image in the horizontal panorama mode are shown, by way of example, in FIGS. 15(a) and 15(b). Photo-taking pictures obtained before and after a photo-taking operation for the n-th image in the vertical panorama mode are shown, by way of example, in FIGS. 16(a) and 16(b). Photo-taking pictures obtained before and after a photo-taking operation for the n-th image in the 2×2 panorama mode are shown, by way of example, in FIGS. 13(a) and 13(b) and FIGS. 14(a) and 14(b). The details of each of these photo-taking pictures are the same as those described in the first embodiment.

As has been described above, according to the second embodiment, if a photo-taking operation for a series of images for forming a panorama image has already started, a setting operation for the image-stabilizing mode is inhibited and a predetermined warning is issued, and, then, if a confirmation is made by the user, the photo-taking operation for a series of images for forming a panorama image is once brought to an end. Accordingly, it is possible to prevent such a situation that photo-taken images which have been processed differently according to the setting of the image-stabilizing mode are mixed during the process of the photo-taking operation for the series of images for forming a panorama image, i.e., images inadequate for forming a panorama image are combined to be photo-taken.

Incidentally, in the above description of the second embodiment, if it is found in the step S330 and/or the step S321 that the confirmation of the end of the photo-taking operation for a series of images for forming a panorama image has been selected, the procedure returns to the step S321, where a new photo-taking operation for a series of images for forming a panorama image is started. However, there is no problem even if, in such a case, the procedure returns to the step S311, where a setting operation for the panorama photo-taking mode is again performed using the panorama photo-taking mode selection picture, and, after that, a new photo-taking operation for a series of images for forming a panorama image is started.

Further, in the above description of each of the first and second embodiments, the vibration detecting part 346 is mounted on the side of the lens unit 300. However, the vibration detecting part 346 may be mounted on the image processing apparatus 100 or may be mounted on both of the side of the lens unit 300 and the side of the image processing apparatus 100. In addition, in a case where the image processing apparatus 100 and the lens unit 300 are integrated into a single body, the vibration detecting part 346 may be mounted at any place of the body as long as the place is such a position as to make the amount of vibration easy to detect.

Further, in the above description of each of the first and second embodiments, the arrangement is provided with both the optical image-stabilizing means and the electronic image-stabilizing means. However, there is no problem even if the arrangement is provided with only one of the optical image-stabilizing means and the electronic image-stabilizing means.

Further, in the above description of each of the first and second embodiments, the start and stop of the operation of the optical image-stabilizing function and/or the electronic image-stabilizing function are effected according to the operation of the release switch. However, this arrangement may be changed to such an arrangement that, if the setting of the optical image-stabilizing function and/or the electronic image-stabilizing function is performed, the operation of the optical image-stabilizing function and/or the electronic image-stabilizing function continues at any time.

Further, in the above description concerning the setting of the photo-taking menu, the setting of the optical image-stabilizing function or the electronic image-stabilizing function can be selected individually. However, this arrangement may be changed to such an arrangement that the setting for operating both the optical image-stabilizing function and the electronic image-stabilizing function simultaneously can be selected.

Further, in the above description of each of the first and second embodiments, the panorama photo-taking mode which is selectable using the panorama photo-taking mode selection picture includes three kinds of modes, i.e., the 2×2 panorama mode, the horizontal panorama mode and the vertical panorama mode. However, the panorama photo-taking mode is not limited to the above modes, and may be a single panorama mode or may be selected from among an arbitrary number of different kinds of panorama modes.

In addition, the display of the panorama photo-taking mode selection picture is not limited to the example shown in FIG. 10, and may be made by an arbitrary arrangement or method using an image or sound.

Further, in the above description of each of the first and second embodiments, the display of the 2×2 panorama mode photo-taking picture is composed of four image areas, in total, which are arranged two-dimensionally in the vertical and horizontal directions. However, the display of the 2×2 panorama mode photo-taking picture is not limited to such an arrangement and may be composed of an arbitrary number of image areas which are arranged two-dimensionally, such as nine image areas, in total, which are arranged two-dimensionally in the vertical and horizontal directions or sixteen image areas, in total, which are arranged two-dimensionally in the vertical and horizontal directions, or may be composed of an arbitrary number of image areas which are arranged three-dimensionally. Further, in the above description of each of the first and second embodiments, the display of each of the horizontal panorama mode photo-taking picture and the vertical panorama mode photo-taking picture is composed of two image areas which are continuously arranged. However, the display of each of the horizontal panorama mode photo-taking picture and the vertical panorama mode photo-taking picture is not limited to such an arrangement and may be composed of an arbitrary number of image areas, such as three image areas or four image areas, which are arranged one-dimensionally.

In addition, the display of the panorama mode photo-taking picture is not limited to the examples shown in FIGS. 11(a) and 11(b) to FIGS. 16(a) and 16(b), and may be made by an arbitrary arrangement or method using an image, sound, character, sign, etc. Further, in the above description of each of the first and second embodiments, the reversing operation for the photo-taking direction in the horizontal panorama mode and the vertical panorama mode is inhibited from being performed after a photo-taking operation for the first image is completed. However, there is no problem even if the photo-taking direction can be reversed at any time.

Further, there is no problem even if the photo-taking direction can be changed at any time to arbitrary directions including the right and left directions, the upward and downward directions and the oblique directions. If, in the invention, the display area of the image display part 28 is increased to enable a great number of image display areas to be displayed simultaneously thereon, it is possible to change the photo-taking direction at any time to arbitrary directions including the right and left directions, the upward and downward directions and the oblique directions. Further, in the above description of each of the first and second embodiments, the re-photo-taking operation in the horizontal panorama mode and the vertical panorama mode can be performed up to the just-preceding photo-taken image. However, there is no problem even if the re-photo-taking operation can be performed up to a photo-taken image preceding an arbitrary number of times.

Further, in the above description of each of the first and second embodiments, an image display area to be subjected to the next photo-taking operation is set to the through display state while an image display area already subjected to a photo-taking operation is set to the quick-review display state, and a reproduced image of the already-photo-taken image and an image to be next photo-taken are displayed with boundary zones thereof partially overlapping. However, the boundary zones of the respective displayed images need not overlap each other.

In the explanatory diagrams for the various panorama modes shown in FIGS. 11(a) and 11(b) to FIGS. 11(a) and 11(b), explanatory letters, such as "LIVE" and "FREEZE", are, by way of example, added to the image display areas. However, on the actual display at the image display part 28, such explanatory letters may be arranged to be displayed or not to be displayed.

Further, in the above description of each of the first and second embodiments, the lens unit 300 is arranged separately from the image processing apparatus 100 and is arbitrarily connectable to the image processing apparatus 100. However, there is no problem even if the lens unit 300 and the image processing apparatus 100 are integrated into a single body. Further, there is no problem even if the image processing apparatus 100 is arranged to allow a plurality of lens units 300 to be detachably attached thereto.

Further, each of the recording media 200 and 210 may be composed of not only a memory card, such as a PCMCIA card or a compact flash memory card, a hard disk, or the like, but also a micro DAT, a magneto-optical disk, an optical disk, such as a CD-R or a CD-ER, a phase-change-type optical disk, such as a DVD, or the like. Further, there is no problem even if each of the recording media 200 and 210 is a composite medium into which a memory card, a hard disk, etc., are integrated. Further, there is, of course, no problem even if a part of the composite medium is detachable therefrom.

Further, in the above description of each of the first and second embodiments, each of the recording media 200 and 210 is arranged separately from the image processing apparatus 100 and is arbitrarily connectable to the image processing apparatus 100. However, there is no problem even if one of or both of the recording media 200 and 210 are fixed to the image processing apparatus 100. Further, the image processing apparatus 100 may be arranged to allow one or an arbitrary number of recording media 200 or 210 to be detachably connected thereto. Further, in the above description of each of the first and second embodiments, the recording media 200 and 210 are attached to the image processing apparatus 100. However, there is, of course, no problem even if one or a plurality of recording media 200, one or a plurality of recording media 210, or a combination thereof is attached to the image processing apparatus 100.

(Other Embodiments)

Further, it goes without saying that the aimed object of the invention can be achieved by supplying a medium, such as a storage medium, in which program codes of software for implementing the function of each of the above-described embodiments is stored, to a system or an apparatus, and by reading and executing the program codes stored in the medium, such as a storage medium, with a computer (or a CPU or an MPU) in the system or the apparatus.

In this case, the program codes themselves which are read out from the medium, such as a storage medium, implement the function of each of the above-described embodiments, and the medium, such as a storage medium, which stores therein the program codes constitutes the invention. As the medium, such as a storage medium, for supplying the program codes, for example, a floppy disk, a hard disk, an optical disk, a magneto-optical disk, a CD-ROM, a CD-R, a magnetic tape, a non-volatile memory card, a ROM, or the like can be used.

Furthermore, while the function of each of the above-described embodiments is implemented by executing the program codes read by the computer, it goes without saying that the function of each of the above-described embodiments can be achieved also when an operating system (OS) running on the computer performs a part of or all of the actual processes on the basis of instructions of the program codes.

Moreover, it goes without saying that the function of each of the above-described embodiments can be realized in such a manner that, after program codes which are read out from a medium, such as a storage medium, are written into a memory provided in a function extension board inserted into a computer or a function extension unit connected to a computer, a CPU or the like provided in the function extension board or the function extension unit performs a part of or all of the actual processes on the basis of instructions from the program codes.

As has been described above, according to each of the above-described embodiments, it is possible to prevent such a situation that photo-taken images which have been processed differently according to the setting/non-setting of the image-stabilizing mode and/or according to the difference in image-stabilizing mode are mixed, i.e., images inadequate for forming a panorama image are combined to be photo-taken.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the invention is not only applicable to a panorama photo-taking operation but also widely applicable to an arrangement for performing a plurality of correlated photo-taking operations, such as a continuous shooting operation.

Further, the software arrangement and the hardware arrangement in each of the above-described embodiments may be adaptively replaced with each other.

Further, in the invention, the above-described embodiments or the technical elements of the above-described embodiments may be combined with each other according to necessity.

Further, the invention also applies to cases where each claim or the whole or a part of the arrangement of each embodiment constitutes one apparatus or is used in combination with another apparatus or as a component element of an apparatus.

Further, the invention is also applicable to various types of cameras, such as electronic cameras for picking up a moving image or a still image, cameras using a silver-halide film, single-lens reflex cameras and lens-shutter cameras, various image pickup apparatuses other than cameras, various image reading apparatuses, various optical apparatuses, and other types of apparatuses, and, moreover, to apparatuses adapted for the cameras, the image pickup apparatuses, the image reading apparatuses, the optical apparatuses and the other types of apparatuses, elements constituting the above-mentioned apparatuses, a control method adapted for the above-mentioned apparatuses, and a computer program product supplying a control program for executing the control method.

What is claimed is:

1. An apparatus comprising:

(A) an image-stabilizing function setting device which sets an image-stabilizing function; and (B) a photo-taking setting device which sets performing a plurality of correlated photo-taking operations, said photo-taking setting device preventing setting of the image-stabilizing function by said image-stabilizing function setting device from being changed during the plurality of correlated photo-taking operations; and (C) a display device displaying a sensed image and information for guiding said photo-taking setting device.

2. An apparatus according to claim 1, wherein said image-stabilizing function setting device performs setting of an optical image-stabilizing function.

3. An apparatus according to claim 1, wherein said image-stabilizing function setting device performs turning-on/turning-off of an optical image-stabilizing function.

4. An apparatus according to claim 1, wherein said image-stabilizing function setting device performs setting of an electronic image-stabilizing function.

5. An apparatus according to claim 1, wherein said image-stabilizing function setting device performs turning-on/turning-off of an electronic image-stabilizing function.

6. An apparatus according to claim 1, wherein said photo-taking setting device sets a panorama photo-taking operation.

7. An apparatus according to claim 1, wherein, if a change of the setting of the image-stabilizing function by said image-stabilizing function setting device is intended to be made during the plurality of correlated photo-taking operations, said photo-taking setting device issues a warning.

8. An apparatus according to claim 1, wherein, if a change of the setting of the image-stabilizing function by said image-stabilizing function setting device is intended to be made during the plurality of correlated photo-taking operations, said photo-taking setting device cancels the current setting of the plurality of correlated photo-taking operations.

9. An apparatus according to claim 1, wherein, if a change of the setting of the image-stabilizing function by said image-stabilizing function setting device is intended to be made during the plurality of correlated photo-taking operations, said photo-taking setting device cancels the current setting of the plurality of correlated photo-taking operations and sets newly performing the plurality of correlated photo-taking operations.

10. An apparatus according to claim 1, wherein said apparatus includes an image pickup apparatus.

11. An apparatus according to claim 1, wherein said apparatus includes a camera.

12. An apparatus according to claim 1, wherein said apparatus includes a video camera.

13. A control method adapted for a photo-taking apparatus, said control method comprising:

setting performing a plurality of correlated photo-taking operations, and preventing setting of an image-stabilizing function from being changed during the plurality of correlated photo-taking operations; and displaying a sensed image and information for guiding said photo-taking setting step.

14. A computer program product supplying a control program adapted for a photo-taking apparatus, said computer program comprising contents of:

settings performing a plurality of correlated photo-taking operations, and preventing setting of an image-stabilizing function from being changed during the plurality of correlated photo-taking operations; and displaying a sensed image and information for guiding said photo-taking setting step.

* * * * *

UNITED STATES PATENT AND TRADEMARK OFFICE
CERTIFICATE OF CORRECTION

PATENT NO. : 6,510,283 B1
DATED : January 21, 2003
INVENTOR(S) : Yoichi Yamagishi It is certified that error appears in the above-identified patent and that said Letters Patent is hereby corrected as shown below:

Column 31,
Line 42, delete "on." and insert -- on --.

Column 42,
Line 44, delete "settings" and insert -- setting --.

Signed and Sealed this

Twenty-third Day of September, 2003

JAMES E. ROGAN
*Director of the United States Patent and Trademark Office*